United States Patent [19]

Rozelle et al.

[11] Patent Number: 5,997,750
[45] Date of Patent: Dec. 7, 1999

[54] COMMUNITY DRINKING WATER PURIFICATION SYSTEM

[75] Inventors: Lee Rozelle, LaCrosse, Wis.; E. Robert Baumann, Ames, Iowa

[73] Assignee: Puraq Water Systems, Inc., Houston, Tex.

[21] Appl. No.: 08/955,888

[22] Filed: Oct. 22, 1997

Related U.S. Application Data

[62] Division of application No. 08/642,535, May 3, 1996.

[51] Int. Cl.$^6$ ..................................................... C02F 9/00
[52] U.S. Cl. ......................... 210/744; 210/794; 210/806; 210/807
[58] Field of Search .................................. 210/663, 669, 210/694, 744, 753, 754, 760, 793, 794, 795, 807, 662, 668, 678, 806

[56] References Cited

U.S. PATENT DOCUMENTS

| | | | |
|---|---|---|---|
| 3,651,942 | 3/1972 | Berardi | 210/140 |
| 3,701,423 | 10/1972 | Lindstol | 210/274 |
| 3,755,157 | 8/1973 | Wisfeld et al. | 210/618 |
| 3,870,033 | 3/1975 | Faylor et al. | 210/900 |
| 3,886,071 | 5/1975 | Weis | 210/274 |
| 4,181,607 | 1/1980 | Schiller et al. | 423/167 |
| 4,196,081 | 4/1980 | Pavia | 210/94 |
| 4,211,654 | 7/1980 | Weber et al. | 210/104 |
| 4,385,998 | 5/1983 | Schiller et al. | 210/807 |
| 4,647,374 | 3/1987 | Ziaylek et al. | 210/242.1 |
| 4,752,397 | 6/1988 | Sood | 210/662 |
| 4,941,962 | 7/1990 | Inoue | 204/302 |
| 5,114,576 | 5/1992 | Ditzler et al. | 210/195.1 |
| 5,133,871 | 7/1992 | Levy | 210/688 |
| 5,211,852 | 5/1993 | Van de Walle et al. | 210/678 |
| 5,415,779 | 5/1995 | Markell et al. | 210/635 |
| 5,449,543 | 9/1995 | Bach et al. | 428/117 |

FOREIGN PATENT DOCUMENTS

WO95/05231 2/1995 WIPO.

OTHER PUBLICATIONS

Baumann, E.R., "Design of Filters for Advanced Waste Treatment", Design Seminar for Wastewater Treatment Facilities, Prepared for Environmental Protection Agency Technology Transfer Program, Cover page, i–iv, 1–, (May 1972).

Baumann, E.R., "Granular–Media Deep–Bed Filtration", *Water Treatment Plant Design*, Edited by Robert L. Sanks, Ann Arbor Science Publishers, Inc., pp. 231–281, (1978).

Baumann, E.R., "The Merrimack: Designs for a Clean River", Consultant's Land and Water Disposal Assessments, Annex A, 1–63, (Aug. 1971).

Baumann, E.R., "The Merrimack: Designs for a Clean River", Annex A, Cover page, pp. i–ii, (Aug. 1971).

Baumann E.R., et al., "Granular Filters for Tertiary Wastewater Treatment", *First Pacific Chemical Engineering Congress*, Part I, PACHEC '72, Cover page, pp. 88–98, (Oct. 10–14, 1972).

(List continued on next page.)

*Primary Examiner*—Ivars Cintins
*Attorney, Agent, or Firm*—Schwegman, Lundberg, Woessner & Kluth PA

[57] ABSTRACT

This invention comprises a process and apparatus for producing purified drinking water from surface or ground fresh water sources using no chemical pre-treatment or coagulants, by usage of a positively-charged filtration media to attract the typically negatively-charged suspended solids present in the water source. The process, which can be portable, includes a filtration system having a filtration/recirculation/backwash component and a disinfection step. The process further includes a system controller which receives electrical signals from float controls to control the filtration, recirculation, and backwash steps. This process produces drinking water which meets or exceeds the guidelines set by the World Health Organization for turbidity and microbiological content.

21 Claims, 18 Drawing Sheets

OTHER PUBLICATIONS

Weber, W.J., et al., "Physicochemical Processes for Water Quality Control", Published by Wiley–Interscience, John Wiley & Sons, Inc., Title page, 139–198, (1972).

"Wastewater Filtration—Design Considerations", EPA Technology Transfer Seminar Publication, U.S. Environmental Protection Agency, (Jul. 1974).

Arbuckle, J.G., et al., "Environmental Law Handbook", Government Institutes, Inc., Tenth Edition, Rockville, MD, Cover Page, pp. ii, (1989).

"Case Study: FloMag G in a Printed Circuit Board Operation", Technical Bulletin from Martin Marietta Magnesia Specialties, Inc.

"Drinking Water and Sanitation", *WWF Atlas of the Environment*, 2nd Ed., p. 29–32.

"Flocon 100—High Performance Antiscalant for Membrane Systems", FMC Corporation Product Information, 1 page, (1992).

"FloMag G Granular Magnesium–Based Adsorbent for Water Treatment", Product Brochure from Martin Marietta Magnesia Specialties, Inc.

"FloMag G Magnesium–Based Adsorbent", *Environment Product Profiles, National Environmental Technology Applications Corporation*.

"Mag Chem 10—Hard Burned Technical Grade Magnesium Oxide", Product brochure from Martin Marietta Magnesia Specialties, Inc.

"Mag Chem P–98—Deadburned Milled Technical Grade Magnesium Oxide", Product brochure from Martin Marietta Magnesia Specialties, Inc.

"Mobile Purification", *Finishing*, vol. 14, No. 7, 40, (Jul. 1990).

"Portable Package Plant (P3)", Product Brochure, Strainrite/Miox.

"Standard Methods for the Examination of Water and Wastewater, 18th Edition", A.E. Greenberg et al. (eds.), American Public Health Association, pp. 2–8—2–9, 9–1, (1992).

"Surface Water Treatment Rule", *Appendix D*.

"The Safe Drinking Water Act", *EPA Guide to the Requirements for the Operators of Small Water Systems*, 14–21, (Jun. 1993).

"The Universal Almanac 1995", John W. Wright (ed.), Universal Press Syndicate Company, 379–380.

"Water Quality and Treatment; A Handbook of Community Water Supplies", *American Water Works Association*, Frederick W. Pontius, Technical Editor *American Water Works Association*, Frederick W. Pontius, Technical Editor, Fourth Edition, McGraw–Hill, 49–59, (1990).

Bagwell, T.H., et al., "The Army water supply program: An overview", *Desalination*, vol. 99, 409–421, (1994).

Baumann, E.R., "Water, It's Quality, and You!", Paper presented at the International Technical Conference on Filtration and Separation, Sponsored by the new American Filtration Society, Ocean City, MD, (Mar. 21–24, 1988).

Bell, G.R., "Removal of Manganese by Controlled Precipitation and Filtration", *Journal AWWA*, 655–662, (May 1965).

Bell, G.R., "Removal of Soluble Iron by Filtration", *Jour. AWWA*, vol. 57, No. 4, 458–471, (Apr. 1965).

Brandt, B., "'Remote Control' Used to Fight Giardia", *Journal AWWA*, vol. 86, No. 2, 137–138, (Feb. 1994).

Coogan, G.J., "Diatomite Filtration for Removal of Iron and Manganese", *Journal AWWA*, 107–1517, (Dec. 1962).

Farrah, S.R., et al., "Adsorption of Viruses by Diatomaceous Earth Coated with Metallic Oxides and Metallic Peroxides", *Water Science and Technology*, vol. 24, No. 2, 235–240, (1991).

Ghosh, M.M., et al., "Precipitation of Iron in Aerated Ground Waters", *Journal of the Sanitary Engineering Division*, 199–213, (Feb. 1966).

Ginocchio, J.C., "Compact Treatment Unit with Defluoridation for Drinking Water", *Water Supply*, vol. 2, No. 3–4, SS8–11 to SS8–13, (1984).

Guillemin, F., et al., "Faecal Contamination of Rural Water Supply in the Sahelian Area", *Water Research*, vol. 25, No. 8, 923–927, (Aug. 1991).

Katko, T.S., "Reselling and Vending Water", *Journal AWWA*, 63–69, (Jun. 1991).

Kretzschmar, W., "The Compact Water Works (CWW)", *Water Supply*, vol. 1, No. 4, 57–66, (1983).

Lloyd, B.J., et al., "A Low Cost Portable Water Testing Kit for Developing Countries", *Wat. Sci. Tech.*, vol. 17, 1369–1370, (1985).

Lykins, B.W., "Utilization of Small Systems Treatment in Latin America and China", Paper presented at WQA 22nd Annual Convention and Exhibition, Indianapolis, In., (Mar. 189–23, 1996).

Nauleau, F., et al., "Utilization of a Mobile Microfiltration Plant to Make Up For Lack of Water in Drought Periods", *Water Supply*, vol. 11, No.s 3/4, 177–187, (1993).

Nystrom, K.P., "Partnership Provides Iodine Disinfected Water to Chilean Communities", *Water Conditioning & Purification*, 32–34, (Dec. 1995).

O'Connor, J.T., "Iron and Manganese", *In: Water Quality and Treatment: A Handbook of Public Water Supplies*, Prepared by The American Water Works Association, Inc., McGraw–Hill Book Company, 378–396, (1971).

O'Connor, J.T., et al., "Iron Removal Using Magnesium Oxide", *Journal of the Sanitary Engineerin Division*, SA 6, 1335–1348, (Dec. 1970).

Schiller, J.E., et al., "Filtration of Asbestos and Other Solids with Magnesium Oxide", *Reprinted from Mining Engineering*, (Mar. 1983).

Schiller, J.E., et al., "Mineral Processing Water Treatment Using Magnesium Oxide", Paper for Presentation before the 1983 AIChE National Meeting, Denver, CO, 1–21, (Aug. 28–31, 1983).

Schiller, J.E., et al., "Mineral Processing Water Treatment Using Magnesium Oxide", *Environmental Progress*, vol. 3, No. 2, 136–141, (May 1984).

Stenkamp, V.S., et al., "Effect of Iron Oxide Coating on Sand Filtration", *Journal AWWA*, 37–50, (Aug. 1994).

Stumm, W., et al., "Aquatic Chemistry: An Introduction Emphasizing Chemical Equilibria in Natural Waters", A Wiley–Interscience Publication, 612–614, (1981).

Tallman, D.N., et al., "MgO Filtration Research", *Bureau of Mines Information Circular 9138*, United States Department of the Interior, 1–32, (1987).

van der Leeden, F., et al., "The Water Encyclopedia, 2nd Edition", Lewis Publishers, Inc., p. 329–332, (1990).

Xhonneux, G., "Currentless Automatic Potable Water Production Device", Fourth World Filtration Congress: Proceedings, vol. 3, 8.1–8.13, (1986).

COMMUNITY DRINKING WATER PURIFICATION SYSTEM

This application is a division of U.S. patent application Ser. No. 08/642,535 filed on May 3, 1996.

FIELD OF THE INVENTION

This invention relates to drinking water purification systems, and more particularly to a novel comnmunity drinking water purification system for treating ground or surface fresh water supplies in developing countries, remote locations and during emergencies.

BACKGROUND OF THE INVENTION

A safe drinking water supply is a fundamental requirement worldwide. However, more than one billion people lack an adequate supply of safe drinking water. In developing countries and in very rural or remote areas, the critical need is for a drinking water supply free of contamination which can cause acute and potentially fatal illnesses such as bacterial, parasitic and viral diseases. The World Bank estimated in 1992 that more than two million children under five years of age die of diarrhea each year because they do not have access to clean water. Therefore, the goal in these areas is to provide drinking water which meets World Health Organization (WHO) guidelines for "turbidity" and "microbiological and biological content."

Turbidity refers to the cloudiness or muddiness of water, and is defined in the "Standard Methods for the Examination of Water and Wastewater," 18th Edition, American Public Health Association, edited by Greenberg, et al. (1992), as " . . . an expression of the optical property that causes light to be scattered and absorbed rather than transmitted in straight lines through the [water] sample." Turbidity, expressed in Nephelometric Turbidity Units (NTU), is determined with a nephelometric turbidimeter, an instrument which compares the intensity of light scattered by water under defined conditions with the intensity of light scattered by a standard reference suspension under the same conditions. The higher the intensity of scattered light, the higher the turbidity. Microbiological and biological (microbiological/biological) content refers to the level of pathogenic organisms in water, and is normally measured by looking for the presence of indicator or surrogate organisms whose presence indicates the probable presence of pathogenic organisms. The coliform group of bacteria is used as the principal indicator of water quality because the coliform group density is typically much greater in water as compared with other organisms. Examples of other pathogenic organisms found in water include enteric viruses as well as macroorganisms such as *Giardia lamblia, Entamoeba histolytica,* and *Cryptosporidium parvum.* Elimination of possible harmful chemical contamination is not yet a priority in most of these areas since the life expectancy is generally less than the average time necessary to develop chronic illnesses such as cancer.

Safe drinking water is also a critical need worldwide after natural catastrophes and during armed conflicts. The ability to maintain an adequate supply of safe drinking water can also be difficult for certain industries such as mining or road building, or remote institutions such as field hospitals and clinics. Furthermore, the need for a "point-of-use" drinking water supply is also applicable in U.S. national parks and forests, or other locations which serve a transient population. In the United States, however, drinking water must also meet the standards of the Safe Water Drinking Act.

Drinking water which has low turbidity and microbiological/biological content can be produced from ground or surface fresh water supplies by various methods. A typical water treatment system involves rapid rate filtration through sand media. This method can produce as much as about 300–350 cubic meters of water per day per square meter ($m^3/day/m^2$). However, since the particulates removed by the filters penetrate deep into the filter bed, the filter bed needs to be cleaned at regular intervals to prevent plugging. Furthermore, most suspended solids (dirt and microorganisms) are negatively-charged because there is an excess of negative ions on the surface of the particles themselves. Therefore, this method of rapid rate filtration requires chemical pretreatment of the raw water with a coagulant such as alum (hydrated aluminum sulfate) or an organic polymer to impart a positive charge to the negatively-charged solids. In this way, an electrostatic attractive force is created between the suspended solids and the negatively-charged filtration media, so that the filter media can effectively filter out the suspended solids. Other pretreatment steps typically include flocculation and sedimentation following the chemical addition. Flocculation is necessary to mix the suspended solids and coagulants together to produce a precipitate or floc that becomes large enough to settle. Sedimentation allows the floc to settle to the bottom of a tank while the clearer supernate containing the residual positively-charged suspended solids is removed at the top for subsequent passage through the filter media. Although treatment plants can produce quality water with this method, the required capital, labor and resources required to build and operate such a system makes it virtually unavailable in many parts of the world.

A process for the removal of metal ions from water which comprises filtering the water through a bed or layer of granular lightburned or hardburned magnesium oxide is disclosed in U.S. Pat. No. 5,211,852 to Van de Walle, et al. This process is not directed to removing particulates or producing potable drinking water, but to reducing toxic metal ion pollutants which are released by industry into the waterways.

U.S. Pat. No. 4,385,998 to Schiller, et al., discloses the use of magnesium oxide (MgO) for filtering suspended solids from water sources such as process effluents, but does not disclose a method or apparatus for a community drinking water purification system.

Thus, what is needed is a technically simple, cost-effective, and reliable method for producing potable drinking water from ground and surface fresh water supplies during emergencies worldwide, and at all times in developing countries and rural or remote areas.

SUMMARY OF THE INVENTION

The present invention provides a technically simple, cost-effective and reliable community drinking water purification system for supplying drinking water which not only meets the guidelines of the World Health Organization (WHO) for turbidity and microbiologicalubiological content, but can also be designed to meet the standards set by individual countries for drinking water quality. The system is portable to allow operation in the immediate vicinity of surface or ground fresh water sources in a location readily accessible to those in the area who are in need of potable or safe drinking water.

The present invention is a compact multi-component water treatment system directed to removing particulates and microbes through use of a process which is not only portable, but is extremely simple to set-up, run, and maintain. It is therefore well-suited for those situations in which the operators and maintenance workers are not highly-trained technicians, such as in developing countries, in rural or remote locations, and during emergencies worldwide. Use of a positively-charged media with the present invention completely eliminates the need for chemical pretreatment with coagulants, as well as the need for the steps of flocculation and sedimentation. Such pretreatment steps, which are required in conventional drinking water treatment systems to attract the negatively-charged suspended solids, not only add to the cost of conventional systems, but to the complexity as well, since highly-trained operators are needed in order to ensure that the pretreatment steps are performed correctly. Furthermore, by recirculating already-filtered water, the present invention further reduces the turbidity of stored drinking water without the need for additional filters or other equipment. These advantages, combined with a minimal power requirement and a simple backwash step, provide significant benefits over conventional treatment systems. Specifically, the present invention provides, for the first time. a novel and reliable method for producing potable drinking water with minimal capital, labor and resources, virtually anywhere in the world where there is a ground or surface fresh water source nearby.

In operation, ground or surface fresh water containing suspended solids and larger objects are drawn by a suction pump into an intake hose whose end portion in the water source is supported by floats and protected by a screen which is designed to prevent larger objects and debris such as twigs, leaves, and so forth, from entering into the intake hose. The screened raw water, still containing the suspended solids, is then drawn into a filtering column containing a suitable positively-charged filter media such as MgO. After being filtered, the water is disinfected with a suitable disinfectant, preferably one which has a residual effect such as chlorine, iodine, or mixed oxidants, and passes into a drinking water storage tank for use as needed. When a sufficient amount of stored drinking water is produced, it can be recirculated again through the filter media to reduce the turbidity even further. A periodic backwash of water and air is used to clean the filter media.

In one embodiment, the system utilizes electronic sensing devices such as float sensors to deliver electrical signals to a system controller. In this way, the flow of raw water from the source, through the filter media and into the drinking water storage tank is controlled. Also, when the level of stored drinking water reaches a predetermined high level in the storage tank, the system controller sends control signals to the appropriate valves to open or close, so that stored drinking water can be recirculated through the filter. When the head (water level) above the filter media reaches a predetermined maximum or high level in the filtering column, the appropriate valves are again opened or closed, allowing drinking water and compressed air to flow upwardly in the filtering column to backwash the media. In addition to the system controller, a timer can be used to provide for an additional backwash step during off-peak hours.

These and other features, aspects, and advantages of the present invention will become better understood with regard to the following description, appended claims and accompanying drawings.

DETAILED DESCRIPTION OF THE INVENTION

Figure 1A:
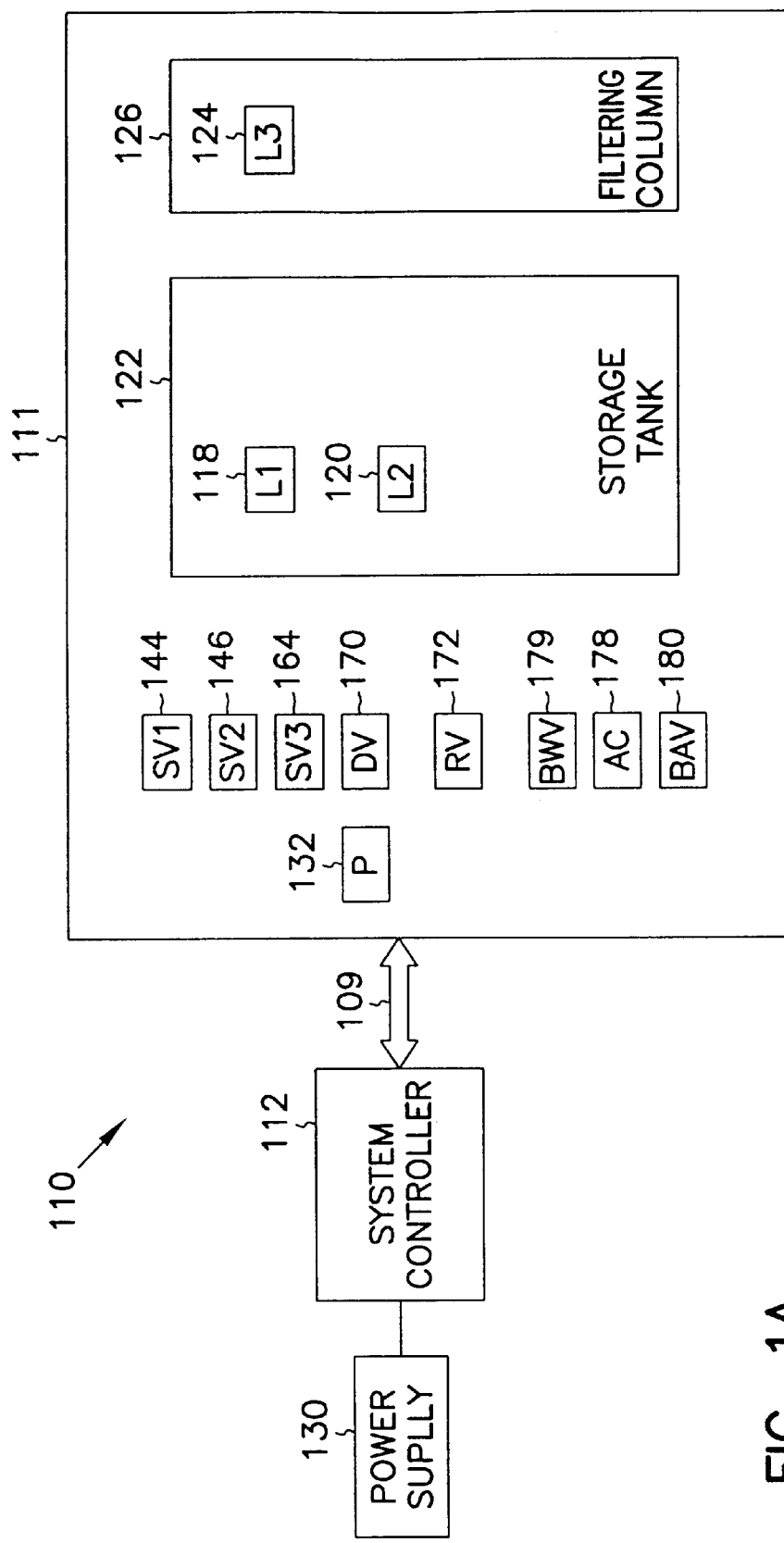
FIG. 1A is a block diagram of a control system for operating a drinking water purification system in accordance with one embodiment of the present invention.

In the following detailed description, reference is made to the accompanying drawings which form a part hereof, and in which is shown by way of illustration, specific embodiments in which the invention may be practiced. These embodiments arc described in sufficient detail to enable those skilled in the art to practice the invention, and it is to be understood that other embodiments may be utilized and that structural, procedural and system changes may be made without departing from the spirit and scope of the present invention. The following detailed description is, therefore, not to be taken in a limiting sense, and the scope of the present invention is defined by the appended claims.

Numbering in the Figures is usually done with the hundreds and thousands digits corresponding to the figure number, with the exception that the same components may appear in multiple figures.

One embodiment of the present invention provides a method and apparatus for producing a point-of delivery drinking water supply to communities which not only complies with WHO guidelines for turbidity and microbiological/biological content, but can also be designed to comply with other applicable standards for drinking water quality. Typically, however, the standards for drinking water quality in developing countries are the same as the guidelines set by the WHO. A point-of-delivery system refers to a system whereby the consumer comes to the location of a treatment system to either use the water on site, or preferably to fill a container with water for use at another location.

As discussed above, turbidity is a measure of the amount of light that is reflected off suspended particles in the water. According to the most recent "WHO Guidelines for Aesthetic Quality," drinking water should have a turbidity less than about five (5) NTU, but preferably less than about one (1) NTU, for disinfection efficiency. According to the "WHO Guidelines for Microbiological and Biological Quality," the microbiologicallbiological content of bottled drinking water and emergency water supplies should be zero (0) coliform organisms per 100 milliliters (100 mL) such that the water is free of pathogenic organisms. These and other guidelines or standards for various regions including Canada, the United States, and the European Community, are found in the book entitled. "Water Quality and Treatment—A Handbook of Community Water Supplies", 4th ed., McGraw-Hill, Inc., edited by the American Water Works Association (1990).

As discussed above, most suspended particles are negatively charged because there is an excess of negative ions on the surface of the particles themselves. As a result, conventional drinking water treatment systems require the use of chemical coagulants to impart a positive charge to the suspended particles prior to filtration with a negatively-charged filter media. The present invention does not require the use of chemical coagulants to impart a positive charge to the suspended particles. Instead, the present invention utilizes a positively-charged filter media which creates an electrostatic or attractive force with the negatively-charged suspended particles or solids, thereby eliminating the need for chemical pretreatment, flocculation. and sedimentation of the water prior to filtration. Furthermore, the present invention includes a recirculation step which allows the already-disinfected drinking water to be filtered repeatedly so that the turbidity level of the drinking water in the storage tank can be lowered even further, rather than shutting down the system when the storage tank is full. Also, by automating the filtration/backwash/recirculation component of the present invention, the system is simple to operate and requires very little maintenance.

Referring to FIG. 1A, a block diagram of one embodiment of a community drinking water purification system (water treatment system) 110 is shown comprising a power supply 130, a system controller 112 and a system unit 111. In one embodiment the system controller 112 comprises a computer processor, non volatile memory, input device and monitor. The system controller 112 is coupled to various sensing devices to monitor certain variables or physical phenomena, process the variables, and output control signals to control devices to take necessary actions when the variable levels exceed or drop below selected or predetermined values. Such amounts are dependent on other variables, and may be varied as desired by using the input device of the controller. The non volatile memory may comprise a disk drive or read only memory device which stores a program to implement the above control and store appropriate values for comparison with the process variables as is well known in the art. In a further embodiment, the system controller 112 may comprise a state machine coupled to a control panel. Buttons can be provided on the control panel to allow modification of the values and to control the drinking water purification system to enter desired states, such as backwash or recirculation modes.

At start-up, the power supply (or energy supply) 130 is activated so that the system controller 112 and the pump (P) 132 can be turned on. The power supply 130 can be from any suitable source of energy such as a small generator, a solar energy system having solar panels and storage batteries, or a normal power grid system. The water treatment system 110 can operate on either alternating current (AC) or direct current (DC), and the voltage can be any suitable voltage such as 12 volts or 120 volts, depending on the source of the power.

The system controller 112 receives signals from three float sensors: A high water level sensor (L1) 118 and a low water level sensor (L2) 120 in the drinking water storage tank 122, and a filter head level sensor (L3) 124 in the filtering column 126. Whenever the level of drinking water exceeds a predetermined high level in the drinking water storage tank 122 the high water level sensor (L1) 118 outputs information in the form of control signals to the system controller 112. Accordingly, whenever the level of drinking water drops below a predetermined low water level in the drinking water storage tank 122, the low water level sensor (L2) 120 outputs information to the system controller 112. Also, whenever the filter head is above a predetermined maximum head level in the filtering column 126, information is again output to the system controller 112 by the filter head level sensor (L3) 124. The information which is output to the system controller 112 by the various sensors can be via wires or wireless transmitters. The system controller 112, using standard PID control algorithms, responds by opening the appropriate flow path as described in FIGS. 1B, 1C, and 1D.

As shown in FIG. 1A, the devices receiving input from the system controller 112 include a first service valve (SV1) 144, which is a valve through which water to be filtered from the water source flows, and a second service valve (SV2) 146, a valve through which water from the water source or the drinking water storage tank 122 flows to be filtered. Other valves which receive input from the system controller 112 include a third service valve (SV3) 164, a valve through which filtered water flows, and a disinfection valve (DV) 170, a valve through which a suitable disinfect flows. A recirculation valve (RV) 172 through which water from the drinking water storage tank 122 flows to be refiltered, also receives input from the system controller 112. Other devices receiving input from the system controller 112 include an air compressor (AC) 178, a backwash water valve (BWV) 179, and a backwash air valve (BAV) 180, all of which are utilized during the backwash step. The communication for all input and output is via a suitable data bus interface 109.

The various transducing devices used to measure parameters which characterize the predetermined high and low water levels in the drinking water storage tank 122, and the predetermined maximum filter head level in the filtering column 126, as well as the various signals generated thereby, may take a variety of forms or formats. For example, the control elements of the system can be implemented using electrical analog, digital electronic, pneumatic, hydraulic, mechanical or other similar types of equipment or combinations of one or more of such equipment types. while one embodiment of the invention utilizes a combination of pneumatic control elements in conjunction with electrical analog signal handling and translation apparatus, the apparatus and method of the invention can be implemented using a variety of specific equipment available to and understood by those skilled in the process control art.

Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate.

Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter or representative of a desired process value, the signal will bear a relationship to the measured parameter or desired value which permits designation of a specific measured or desired value by a specific signal value. A signal which is representive of a process measurement or desired process value is therefore one from which the information regarding the measured or desired value can be readily retrieved regardless of the exact mathematical relationship between the signal units and the measured or desired process units.

Figure 1B:
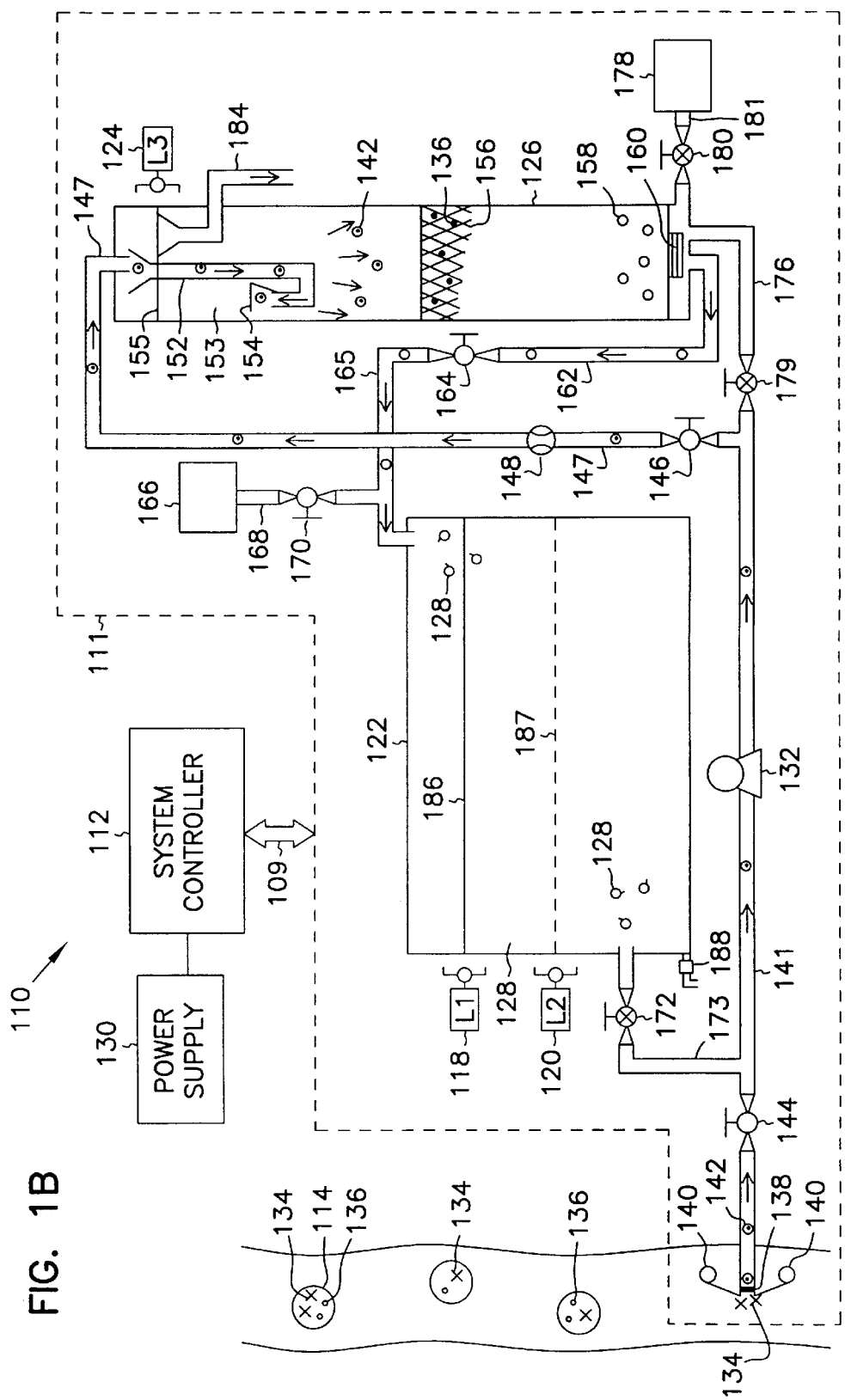
FIG. 1B is a simplified schematic illustration of a drinking water purification system and its associated control system for operating the system during a filtration step in accordance with one embodiment of the present invention.
Figure 1C:
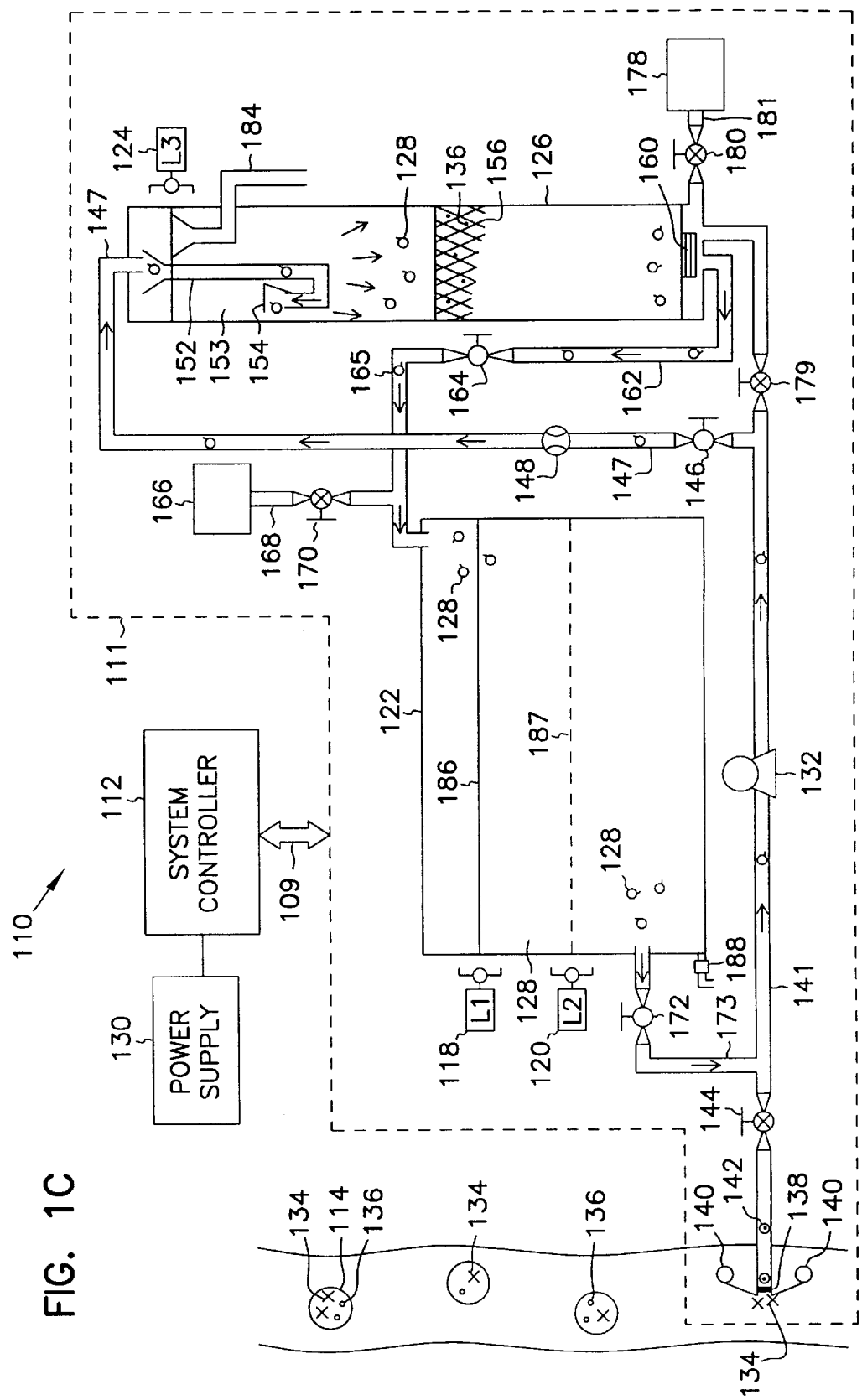
FIG. 1C is a simplified schematic illustration of a drinking water purification system and its associated control system for operating the system during a recirculation or recycling step in accordance with one embodiment of the present invention.
Figure 1D:
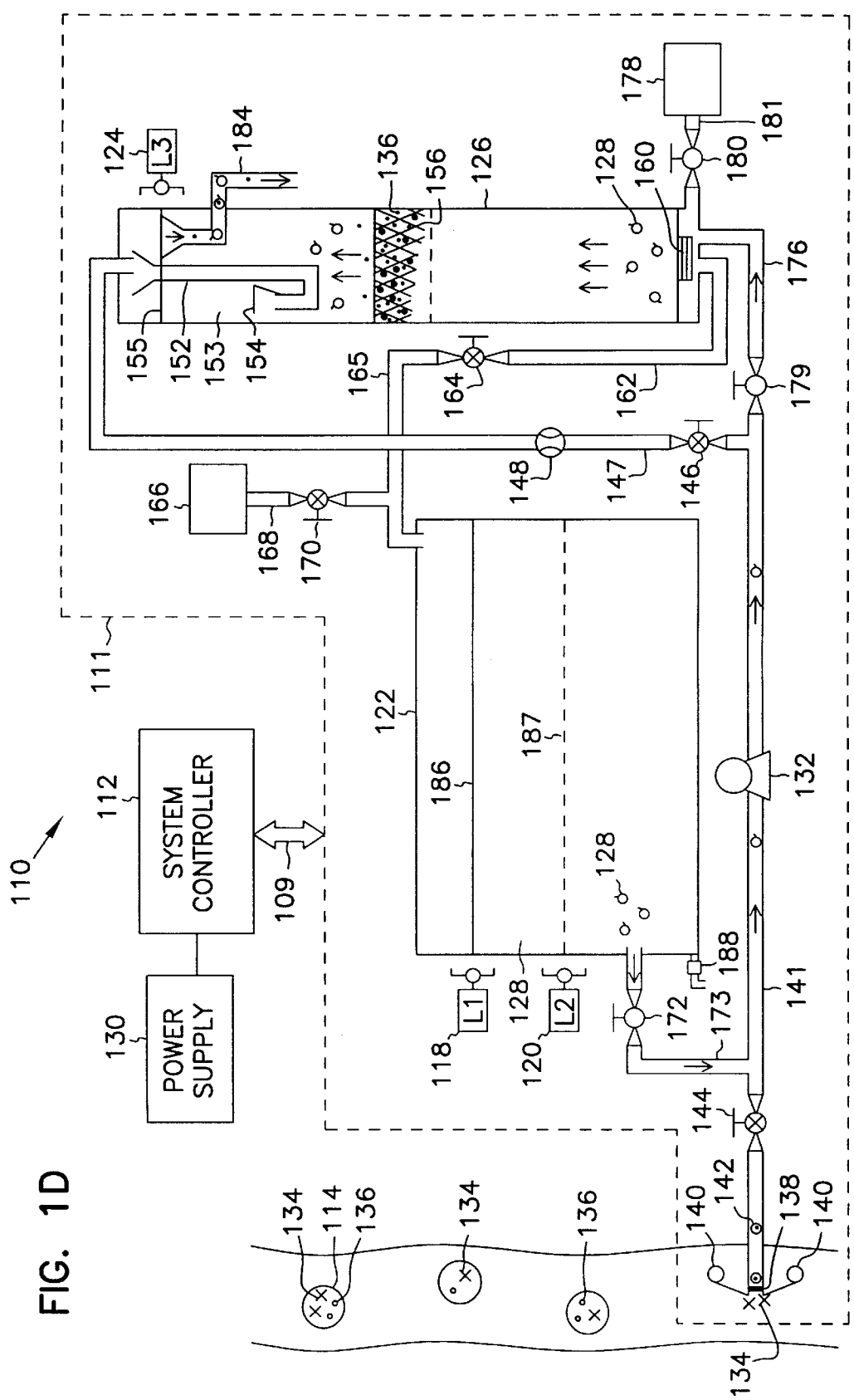
FIG. 1D is a simplified schematic illustration of a drinking water purification system and its associated control system for operating the system during a backwash step in accordance with one embodiment of the present invention.

In addition, the backwash component (which is shown in FIG. 1D) of the water treatment system 110 can be further controlled by a timer or a timing system which can be set to open and close the various valves independently of the level of head in the filtering column 126. The timer can be set to begin a backwash step at an appropriate time so that backwash is achieved on a routine basis, and the system is then returned to filtration or recirculation. For example, routine backwashing can be timed to occur during an off-peak period once every 24 hours, such as at 2:00 A.M., to minimize disruption in drinking water availability. In an alternative embodiment, the backwashing can be accomplished by any backwashing procedures known in the art for cleaning filter media.

Referring to FIGS. 1B, 1C, and 1D, schematic diagrams of one embodiment of the present invention are shown wherein the water treatment system 110 has a system controller 112 in place for controlling various valve positions to permit different flow paths in the system unit 111. The communication between the system controller 112 and the system unit 111 is accomplished with any suitable interface, such as a suitable bus interface 109. The flow paths include direct filtration from raw water 114 as shown in FIG. 1B, recirculation or re-filtration of drinking water 128 from the drinking water storage tank 122 as shown in FIG. 1C, and backwashing of the filter media 156 in the filtering column 126 using drinking water 128 and compressed air as shown in FIG. 1D.

As shown in FIG.1B, direct filtration to produce drinking water 128 is accomplished by pumping raw water 114 from a water source with a pump 132, directly to the top of the filtering column 126 which contains a positively-charged filter media 156. The filtered water 158 exits from the bottom of the filtering column 126 and flows through line 162 and then into line 165 where it is disinfected with a suitable disinfectant prior to entering the storage tank 122.

Specifically, as shown in FIG. 1B, raw water 114, which can have a turbidity of about 100 to 200 NTU or more, is drawn from a suitable water source, such as a lake, river, or well. The water treatment system 110 can technically be located several miles from the water source, but for convenience and economy is preferably located no more than about 30 meters from the water source.

The raw water 114 which typically contains debris 134 as well as suspended solids 136, is drawn through a screen 138 in line 141. The screen 138 is made from any suitable material such as plastic, stainless steel, etc., and is designed to prevent debris 134 from entering line 141. The debris can include objects such as twigs, leaves, and so forth. The screen 138 is easily cleaned and is also preferably designed so that it resists blockage with debris which would interfere with the intake of water. The screen 138 can be checked for debris 134 and cleaned periodically or on a routine basis so that it does not become plugged with debris 134 such that the flow of raw water 114 is severely restricted or completely blocked.

In an alternative embodiment, a flow meter is placed in a suitable location in line 141 to detect if water is flowing through the pump 132. If the flow rate falls below a predetermined minimum rate or approaches zero (0), the system controller 112 can then send appropriate signals such as signaling the system unit 111 to enter into the recirculation phase or to automatically shut down by turning off the energy supply 130.

Line 141 can be flexible and is made from any suitable material including rubber or a plastic material such as Teflon® or polyethylene tubing. Line 141 is of sufficient size so as to maintain the desired flow rate at a reasonable pressure drop, such as about 800–1000 liters per hour with a pressure drop less than about 0.5 meters per 100 meters of hose (line 141). In one embodiment, line 141 is a rubber hose about two (2) to five (5) centimeters in diameter and is of a suitable length. Alternatively, line 141 can be made from a rigid material such as copper, polyvinyl chloride (PVC), galvanized iron, polycarbonate, and so forth. In an alternative embodiment, a portion of line 141 is made from a suitable rigid material, and the remainder is made from a suitable flexible material.

Any number of raw water floats 140 can be attached near the end portion of line 141 so that the end portion of line 141 remains just below the surface of the water, preferably about 0.25 to one (1) meter below the surface. Some water sources, such as certain ponds, lakes or streams, can have algae or other sources of turbidity located just below or on the surface, so that it is not desirable to have the end portion of line 141 located in this area. If possible, the end portion of line 141 should be placed at the level of the cleanest water, although the water treatment system 110 can still produce safe drinking water 128 from the most-highly turbid water. For water sources having a higher turbidity nearer to the surface, the raw water floats can be placed about one (1) to two (2) meters from the end portion of line 141, so that the end portion of line 141 can remain further below the surface of the water source at the desired depth. In the case of a spring-fed lake or stream, the raw water floats 140 are placed far enough from the end portion of line 141 so that the end portion of line 141 is far enough down into the spring source so as to avoid the turbidity caused by the turbulence of the spring as it emerges from its source.

In another embodiment, when the water source is known or suspected to have a soft bottom, a suitable support can be used alternatively, or in addition to the raw water floats 140, to ensure that the end portion of line 141 does not sink into the mud, sand, or silt.

Screened raw water 142 still containing suspended solids 136 is then drawn into an open first service valve 144 before being directed by pump 132 into line 147 and through an open second service valve 146. Service valves 144 and 146 can be any suitable type of flow controllers which are designed to be in either a closed or open position, such as solenoid valves. The screened raw water 142 then passes through a system flow controller 148 in line 147. Although the system flow controller 148 can be placed in any suitable location within the system unit 111, preferably the system flow controller 148 is located in line 147 to control the flow rate at the desired amount. The flow rate can be any suitable amount, such as about 50–300 $m^3$/day/$m^2$ or more of horizontal surface area of the filter media 156. In a preferred embodiment, the flow rate is about 170–250 l/sec/$m^2$ (ten (10)-15 $m^3$/hr/$m^2$). The system flow controller 148 can have a fixed opening or can be manually adjustable so that the flow rate can be increased or decreased as the opening in the system flow controller 148 is increased or decreased.

In an alternative embodiment, the system flow controller 148 is automated such that the system controller 112 can output information it receives from a suitably located flow meter to the system flow controller 148. The system flow controller 148 can then respond by enlarging or reducing its orifice depending on the input received, in order to increase or decrease the flow rate.

Pump 132 can be any suitable size and type of equipment which can produce the desired fluid flow using methods such as centrifugal force, volumetric displacement, mechanical impulse, electromagnetic force, gravity. transfer of momentum from another fluid such as when pumping from inaccessible depths, and so forth. In one embodiment, the pump 132 is a suction centrifugal pump which is capable of supplying water at the desired rate to and through the filtering column 126 and into the drinking water storage tank 122 under the "total system head," i.e., against load head conditions. In one embodiment, load head conditions are about 3.5 to 11 meters, i.e. the distance from the top of the head in the filtering column 126 to the level of the source (the level of the water above the end portion of line 141 where raw water 114 is drawn in) is about 3.5 to 11 meters. This figure includes the friction head required to cause flow through the lines. In alternative embodiments, the pump 132 may supply water at significantly higher pressures or heads.

Line 147 is arranged so that screened raw water 142 travels in an upwardly direction in order to be released at the top of the filtering column 126. The filtering column 126 can be of any suitable size and shape, but in one embodiment is about 30 cm in diameter and about three (3) meters tall. The filtering column 126 can be made from any suitable material, such as fiberglass, stainless steel, polycarbonate or other plastics. In a preferred embodiment, as shown in FIG. 1B, the screened raw water 142 is not released directly into the filtering column 126, but into a line 152 located near the top of the filtering column 126. Line 152 is preferably aj-shaped line having a plate 154 attached near its end in a secure manner such as with clamps, so that when the screened raw water 142 exits line 152 in an upwardly direction, it hits the plate 154 causing the water to fall in a fountain-like manner. Preferably, the plate 154 is about two (2) to four (4) cm above the end of line 152. In this way, channels do not form within the filter media 156 itself due to the force of the water initially entering the filtering column 126 and dropping onto the filter media 156.

Screened raw water 142 then passes through the filter media 156 contained within the filtering column 126. The filter media 156 can be placed anywhere within the filtering column 126 as long as the top of the filter media 156 is below the discharge end of line 165. This placement is necessary to prevent the development of negative head conditions in the filter media 156 which can cause dissolved gases in the water to come out of solution. The filter media 156 can be arranged in any suitable manner to ensure that screened raw water 142 is drawn through at a sufficient rate to achieve adequate filtration, but is preferably arranged to operate as a rapid filtration system. In a preferred embodiment, screened raw water 142 is drawn into the system unit 111 at a rate of about 170–250 l/sec/$m^2$, and the top of the filter media 156 is located at least three (3) to five (5) centimeters below the discharge end of line 165.

The filter media 156 can be any suitable type of media, such as a granular filter media which fills the filtering column 126 to a depth of about one (1) to two (2) meters, and is composed of particles having a particle-size distribution sufficient to provide the desired water quality. A typical particle size ranges between about 0.5 to about two (2) millimeters. The filter media 156 necessarily is a material which exhibits an attractive force for the suspended solids 136 which must be removed from the screened raw water 142 to reduce the turbidity to acceptable levels. Since the suspended solids 136 typically have a negative charge as discussed above, the filter media 156 preferably has a positive electrostatic attraction force or charge. Suspended solids 136 can include dirt, clays, minerals, algae, microorganisms, and so forth.

In one embodiment magnesium oxide (MgO) is used as the filter media. MgO has a naturally-positive electrical charge for all water pH values less than about 11. Most raw water has a pH in the range of about five (5) to nine (9) pH units. There are generally three types of magnesia that are well established and recognized, namely, deadburned MgO or periclase, hardburned MgO, and softburned or light-burned (caustic) MgO.

Deadburned MgO (periclase) is magnesium oxide which has been produced from a temperature greater than about 1800° C. Deadburned MgO has a BET surface area less than about one square meter per gram and a porosity of less than about 20%. (BET is a test method used to determine the surface area, including pores, of materials such as magnesium oxide, activated carbon, and so forth). Deadburned MgO possesses a Bulk Specific Gravity (BSG) greater than about 2.9 grams per cubic centimeter and a crystal size of more than about 25 microns. In one embodiment, granular deadburned MgO can be used, preferably Mag Chem® P-98 from Martin Marietta Magnesia Specialties, Inc., which are high purity milled technical grades of magnesium oxide processed from magnesium-rich brine and shaft kiln calcined. The purity is typically about 98.0%, with the remaining approximately two (2) % being oxides of calcium, silicon, aluminum, and iron, among others. These products have high densities and low reactivities, and are available in several grades.

Hardburned MgO is magnesium oxide which has been produced within a temperature of between about 1200° C. to 1800° C. Hardburned MgO has a BET surface area less than about one square meter per gram and a porosity determination of from about three (3)% to about 50%. Hardburned MgO possesses a BSG of from about 1.8 to 2.4 grams per cubic centimeter, a measured chemical magnesia activity (CMA) of from about 600–900 seconds, and a crystal size of from about one (1) to five (5) microns. In another embodiment, granular hardburned MgO can be used, preferably Mag Chem® 10 from Martin Marietta Magnesia Specialties, Inc., which are high purity technical grades of magnesium oxide process from magnesium-rich brine. The purity is typically about 98.2%, with the remaining components being oxides of calcium, silicon, aluminum, and iron, among others. These products have relatively high densities and low reactivities. They are available in several grades with the granular grades being essentially dust free.

Softburned MgO or lightburned (caustic) MgO is magnesium oxide which has been produced within a temperature range of between about 350° C. to 1200° C. Softburned MgO, which is powdery in its naturally-produced state, possesses a porosity determination of greater than about 50%, and a loose bulk density (LBD) of less than about 0.72 grams per cubic centimeter. As a result, softburned MgO is so soluble in its natural state that it readily enters into solution with the liquid being filtered. Therefore, softburned MgO must be formulated into granules by special techniques such as densification by briquetting prior to being used as a filtration media.

Other positively-charged filter media can include aluminum oxide which has a positive electrical charge for all water pH values less than about 9.5 units.

As the suspended solids 136 are retained within the filter media 156, the water level or head 153 required to sustain the filtration rate will gradually increase, and the screened raw water 142 will be temporarily stored above the filter media 156 until the level of the head 153 ultimately exceeds the maximum head level 155 as monitored by the filter head level sensor 124. Any suitable amount of maximum head level 155 can be provided for, but preferably the maximum head level 155 is at least equal to the length of the filter media 156 being used in the filtering column 126. For example, when the filter media 156 is one and a half (1½) meters in length, the maximum head level 155 will also be about (1½) meters, thus requiring the filtering column 126 itself to be greater than three (3) meters in height. This amount of available head will permit filtering for a suitable period of time, preferably for a minimum of 24 hours between backwash cycles (discussed in FIG. 1D).

Filtered water 158 having a turbidity less than about one (1) to five (5) NTU exits through the bottom of the filter media 156 through the slotted underdrain 160. The slotted underdrain 160 can be located anywhere near the bottom of the filtering column 126, and can be made from any suitable material and be of any suitable size and shape sufficient to retain the filter media 156 in the filtering column 126. In one embodiment, the slotted underdrain 160 is made of plastic of a size such that the flow of filtered water 158 can leave the filtering column 126 with a head loss in the underdrain 160 of about four (4) to six (6) centimeters.

Filtered water 158 then travels in line 162, passes through an open third service valve 164, and enters line 165. Alternatively, the third service valve can be located in line 165. Preferably, the filtered water 158 continues to enter line 162 with sufficient pressure to force filtered water 158 to travel upwardly in line 162 and into line 165 without the need for an additional pump in the system unit 111, although such a pump can be used if needed. Shortly before the filtered water 158 exits line 165, it is purified or disinfected by a suitable disinfection method which preferably leaves a residual effect. E-examples of such methods include chlorination, iodination, or mixed oxidation which utilizes components such as chlorine, ozone, and chlorine dioxide. As shown in FIG. 1B, the disinfectant flows from a disinfection tank 166 through an open disinfectant flow valve 170 in line 168, and then into line 165 containing the filtered water 158. In this way the filtered water 158 is disinfected prior to entering the water storage tank 122 to become disinfected filtered water (or drinking water) 128 preferably having a microbial coliform content of essentially zero (0). In an alternative embodiment, disinfectant flows through line 168 directly onto the filtered water 158 as it exits line 165. The flow of disinfectant can be controlled in any suitable manner so that the appropriate amount is added to the filtered water 158.

Users of the drinking water 128 access the drinking water 128 through one or more spigots 188 located near the bottom of the drinking water storage tank 122. The drinking water storage tank 122 can be any suitable size and shape. In one embodiment, the drinking water storage tank 122 holds about 6,000 liters of drinking water 128, and is about 2.3 meters in diameter and about 1.8 meters in height. The drinking water storage tank 122 can be made from any suitable material, such as fiberglass, stainless steel, polycarbonate or other plastics.

Drinking water 128 continues to flow into the drinking water storage tank 122 until the level of drinking water 128 reaches the high water level 186 as monitored by the high water level sensor (L1) 118. Any suitable high water level 186 can be used as long as the drinking water 128 does not overflow the top of the drinking water storage tank 122. In one embodiment, the high water level 186 is about two (2) centimeters to about 12 centimeters from the top of drinking water storage tank 122.

As shown in FIG. 1C, whenever the level of drinking water 128 rises above the high water level 186, the high water level sensor (L1) 118 outputs this information through the bus 109 to the system controller 112. In this way, the recirculation step is initiated. The system controller 112 responds by sending a control signal to the first service valve 144 to close so that the flow of raw water 114 into line 141 is stopped. At about the same time as this action, preferably simultaneously, the system controller 112 sends the appropriate signals to open a recirculation valve 172 as well as to close the disinfectant valve 170 so that the flow of disinfectant in line 168 is interrupted. As a result, drinking water 128 from the drinking water storage tank 122 is pumped by pump 132 first through line 173, then into line 141 and up into line 147, passing through the second service valve 146 which remains open. The drinking water 128 also passes through the system flow controller 148 which remains open the appropriate amount to maintain the desired flow rate. The drinking water 128 is released at the top of the filtering column 126, preferably into line 152 so that it can pass again through the filter media 156 to remove even more suspended solids 136. In this way, the turbidity of the drinking water 128 is reduced even further.

Referring to FIG. 1D, when the filter media 156 becomes overloaded with suspended solids 136, the head 153 on top of the media rises past the maximum head level 155 as monitored by the filter head level sensor (L3) 124. This causes the filter head level sensor (L3) 124 to output information to the system controller 112 which in turn sends the appropriate signals to the various valves to open or close so that a backwash step can begin as shown in FIG. 1D. This can occur while the water treatment system 110 is filtering or recycling.

If backwashing is necessary during the recirculation or recycling step, the system controller 112 causes both the second service valve 146 in line 147 and the third service valve 164 in line 162 to close, and the backwash valve 179 in line 176 to open at about the same time, preferably simultaneously. In this way, the flow of drinking water 128 from the storage tank 122 is redirected such that it now flows through line 176, and enters the bottom of the filtering column 126 through the slotted underdrain 160 and flows upwardly into the filter media 156. At about the same time as the above actions, preferably simultaneously, the air compressor 178 is turned on and the backwash air flow valve 180 is opened so that compressed air at a rate of about one (1) to two (2) $m^3/min/m^2$ can also enter the filtering column 126 through line 181 near the bottom. In an alternative embodiment, the compressed air flows directly into line 176 so it can co-mix with the drinking water 128 flowing in line 176 prior to entering the bottom of the filtering column 126.

The compressed air and drinking water 128 flow up through the filtering column 126 at a suitable rate, such as about 20–25 $m^3/min/m^2$ to agitate and partially fluidize the filter media 156 so that attached suspended solids 136 are dislodged from the filter media 156. As a result of the flow of compressed air and drinking water 128, the filter media 156 expands about 15–20% of its normal height as shown in FIG. 1D.

The drinking water 128 and air continue to flow upwardly in the filtering column 126 until the drinking water 128 exits through the automatic overflow line 184 and is disposed of as waste. The waste can be diverted to the raw water source or emptied onto the ground. The backwash step can last for any suitable amount of time, such as 10–12 minutes. Shortly before the end of the backwash step, the system controller 112 causes the backwash air flow valve 180 to close and the air compressor 178 to turn off at about the same time, preferably simultaneously. In this way, compressed air can be eliminated from within the filter media 156 while drinking water 128 is still flowing upwardly through the now-expanded filter media 156. Any suitable amount of time can be allowed for the compressed air to be eliminated. In one embodiment, the air compressor 178 is shut off and the backwash air flow valve 180 are turned off about two (2) to five (5) minutes before the end of the backwash cycle.

After the two (2) to five (5) minutes in which drinking water 128 only is flowing through the now-expanded filter media 156, the system controller 112 causes the backwash water valve 179 in the backwash line 176 to close and the second service valve 146 in line 147 and the third service valve 164 in line 162 to open at about the same time, preferably simultaneously. In this way, drinking water 128 is again directed into the top of the filtering column 126 for recirculation.

When backwashing is initiated while the system is in the raw water 114 filtration mode, such as at start-up or when the level of drinking water 128 drops below the low water level 187, the system controller 112 closes the first service valve 144 in line 141 and then opens the recirculation valve 172 in line 173 at about the same time, preferably simultaneously. (The low water level 187 is established at a level such that at least one (1) $m^3$ is still in the drinking water storage tank 122. In this way there is an ample supply of water not only for backwash, but for usage of drinking water 128 from the spigots 188 by customers during the backwashing cycle). The system controller 112 then causes the disinfection valve 170 in line 168 to close at about the same time, preferably simultaneously, with the actions described above for backwashing during the recirculation mode. When the water treatment system 110 is ready to return to the raw water filtration mode, the same valves are opened and closed as discussed above, with the addition of the disinfection valve 170 in line 168 also being opened.

Although pressure and temperature in lines 141, 147, 162, 165, 168, 173, and throughout the water treatment system 110 can be monitored, this is not necessary as long as the flow rate of the drinking water exiting in line 165 is kept within a fixed range as discussed above. If these variables are monitored, however, the respective sensors can be coupled with the system controller 112 so that corrective action can be taken if values exceed or drop below predetermined levels. For example, if the temperature of the water in any of the system lines is determined to be colder than a predetermined minimum temperature, a portable heater can be utilized at an appropriate place in the system to warm the lines to an appropriate temperature. Alternatively, or in addition to a heater, the lines themselves as well as the other equipment can be insulated where necessary in colder climates. Such additional components, however, add to the cost of the water treatment system 110.

Also, when the water treatment system 110 is initially installed, various tests can be run to determine turbidity and microbial levels. The system is designed, however, so that such measurements do not need to be made on a routine basis.

Figure 2:
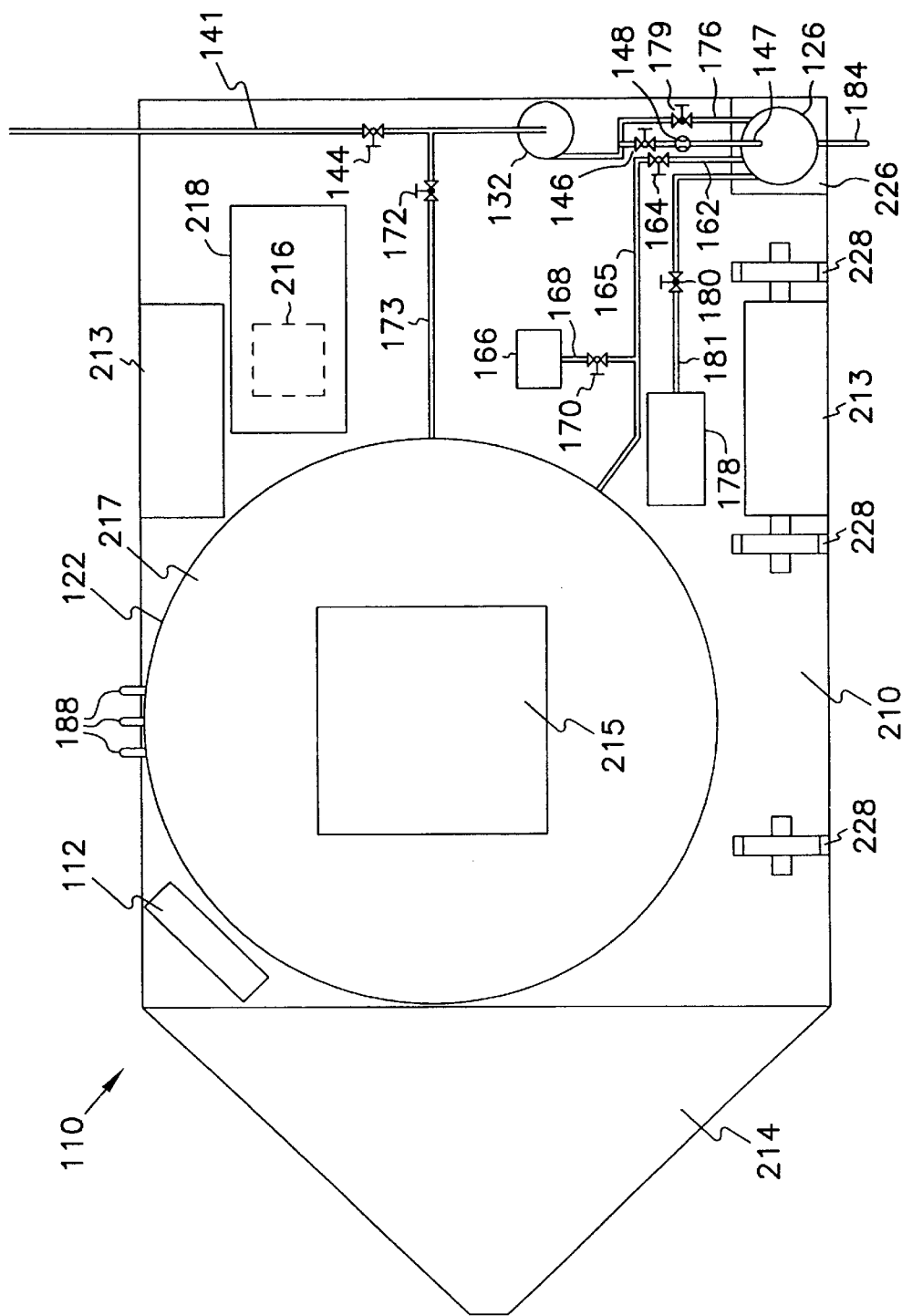
FIG. 2 is a simplified top view of the drinking water purification system and its associated control system for operating the system during a filtration step in accordance with one embodiment of the present invention.

FIG. 2 depicts a top view of a portable embodiment of the water treatment system 110 (during a filtration step) positioned on a trailer 210 having a hitch 214. Any type of device can be used which provides adequate support for the components of the water treatment system 110, and which is movable, including a skid. FIG. 2 shows the wheel wells 213 for one embodiment of the present invention. The filtering column 126, shown in a vertical operational position, rests on a hinged base 226 which folds down. In this way, the filtering column 126 can be stored in at an angle or slope during travel, such that it rests over the top of a wheel well 213 on travel cradles 228 which are progressively taller to provide angled support.

Although any suitable source of power can be used, FIG. 2 shows solar panels 215 located on top of the cover 217 for the drinking water storage tank 122. In addition to the solar panels, at least one batter, 216, and preferably more, are used to store the solar energy for days on which the sun is not shining. All of the batteries 216 are preferably stored in a storage cabinet 218. The storage cabinet 218 can also house other types of energy sources such as a generator. It is also a storage place for disinfectant and other supplies.

The drinking water storage tank 122 can have one or more delivery points or spigots 188 as shown, but preferably has at least three (3) spigots 188 as shown in FIG. 2. In an alternative embodiment of the present invention, a granular activated carbon (GAC) module, commonly referred to as activated charcoal is placed in the line just prior to the delivery points to reduce organic contaminants such as taste and odor compounds or disinfection by-products.

The drinking water storage tank 122 is preferably covered with a suitable cover 217 to protect it from the elements. Ann, type of cover 217 can be used such as cloth or rigid plastic, as long as it adequately covers the drinking water storage tank 122 and remains secure. In an alternative embodiment, a simple shelter such as a tarp or storage shed can be used to protect the entire water treatment system 110 from the elements.

Figure 3:
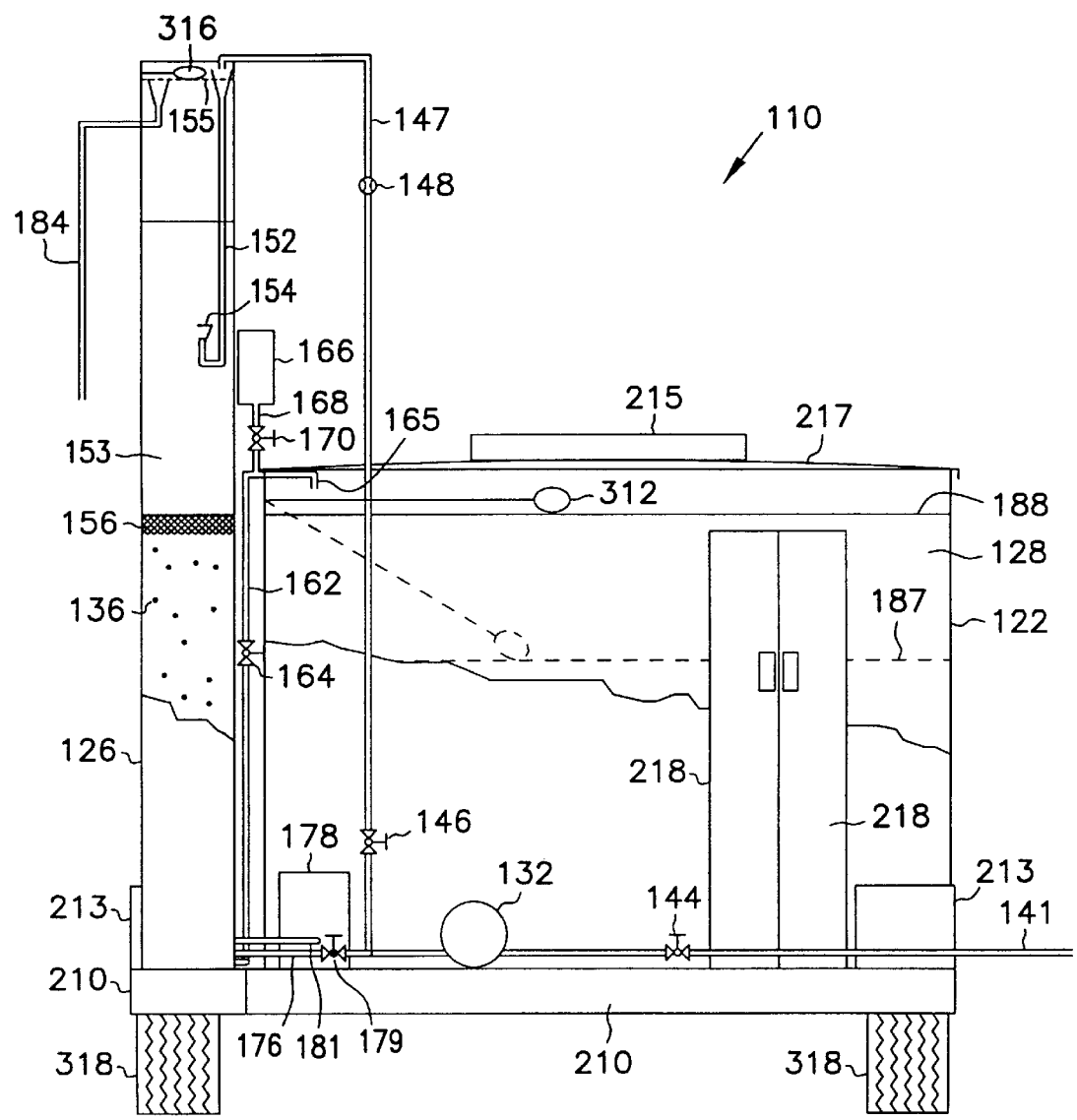
FIG. 3 is a partially-broken away end view of the drinking water purification system and its associated control system for operating the system in accordance with one embodiment of the present invention.

FIG. 3 shows a partially cut-away end view of the water treatment system 110 on trailer 210 having wheels 318. The water treatment system 110 is shown, just at the point when filtration has caused the drinking water 128 in the storage tank 122 to reach the high water level 186. As a result, the water level float 312 will activate the high water level sensor (L1) 118 (not shown) to begin a recirculation step as discussed in FIGS. 1A and 1B. In contrast, when the drinking water 128 reaches the low water level 187, the water level float 312 is in the lower position as indicated by the dashed lines, causing the low water level sensor (L2) 120 (not shown) to send signals to the system controller 112 to begin the raw water filtration step, as discussed in FIG. 1A. In an alternative embodiment, there are two water level floats, one for monitoring the high water level 186 and one for monitoring the low water level 187. As discussed above, the backwash step is initiated when the head 153 in the filtering column 126 reaches the maximum head level 155. This causes the filter head float 316 to activate the filter head level sensor L3 (124) (not shown) to begin the backwash step.

Figure 4:
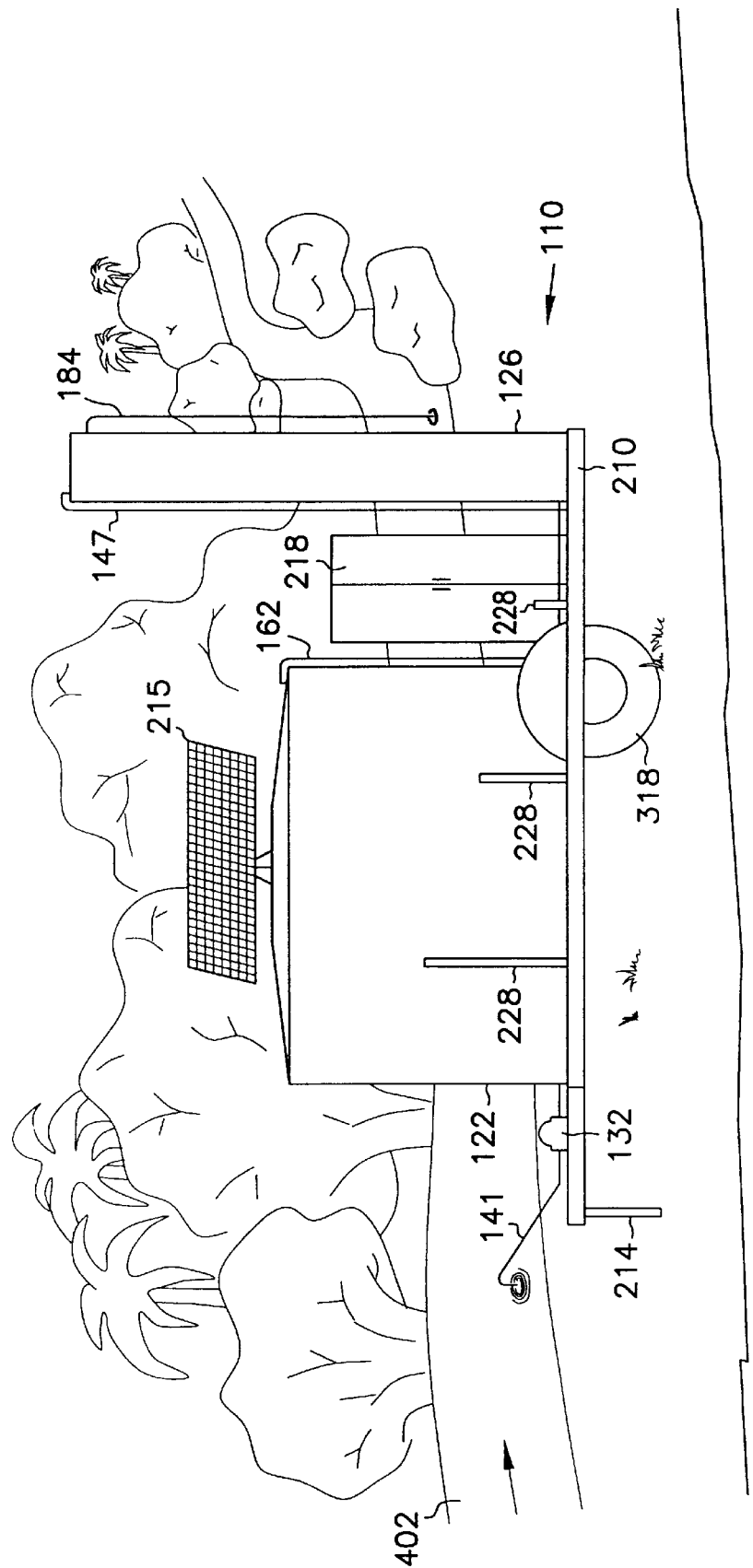
FIG. 4 is a side view of the drinking water purification system shown in use on a trailer in accordance with one embodiment of the present invention.

FIG. 4 shows a simplified side view of one embodiment of the present invention in use on a trailer 210 near a small stream 402. In this embodiment solar panels 215 are used as the energy source. Furthermore, FIG. 4 shows that line 141 is preferably placed upstream and the waste from line 184 is discharged downstream.

Figure 5:
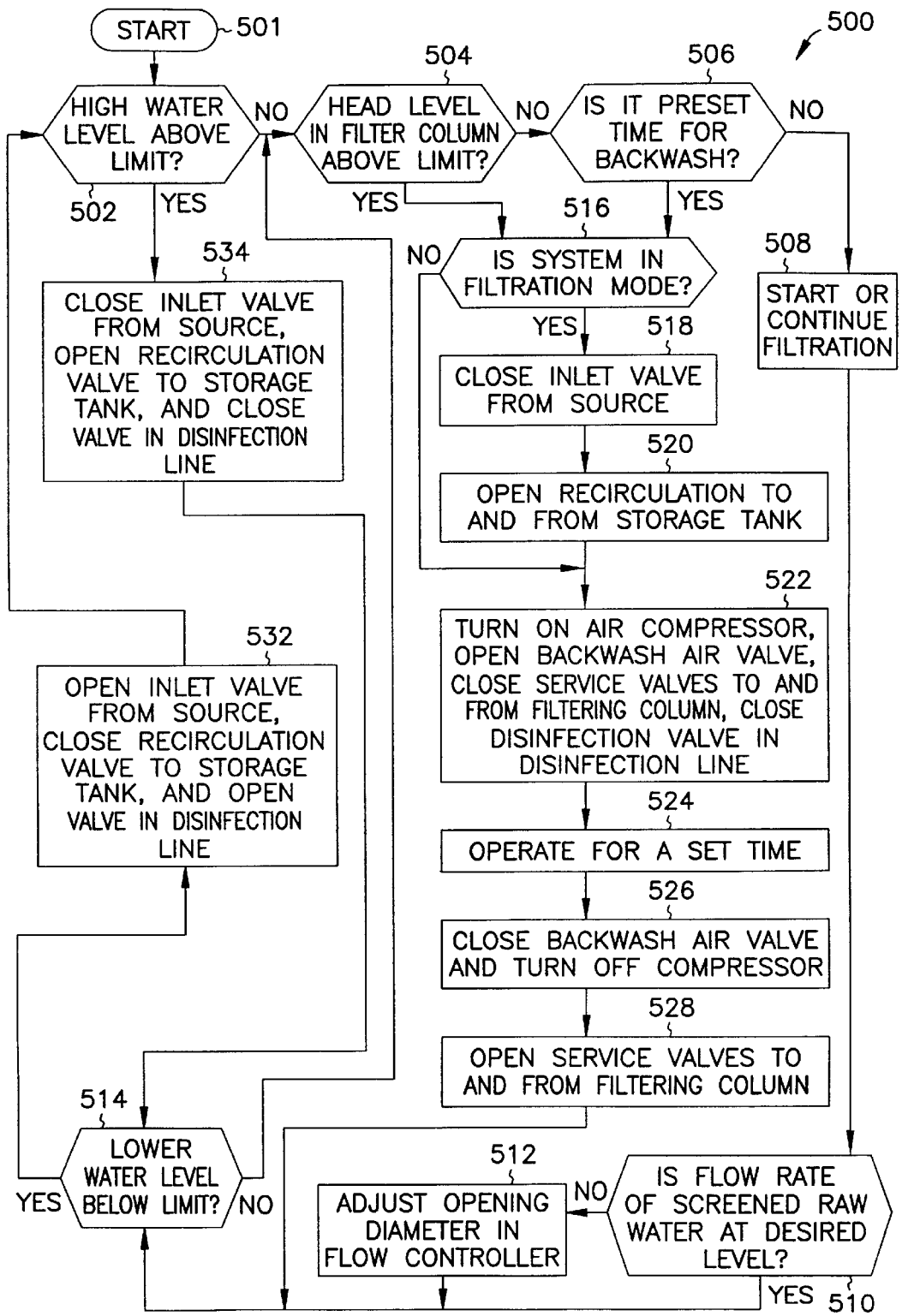
FIG. 5 is a flow diagram of one embodiment of the process of the drinking water purification system of the present invention.

Referring to FIG. 5, a process of one embodiment of the present invention 500 is shown which details the operation of the drinking water treatment system having a filtration/recirculation/backwash component together with a positively-charged filter media. FIG. 5 also includes the backwash timer component and the automated flow control for the system flow controller discussed above as alternative embodiments. The process begins at the start 501 wherein the energy supply is activated such that the system controller and pump are turned on. A determination 502 is then made as to whether the high water level is above a predetermined limit. The predetermined high limit is a level of drinking water which is relatively high in the drinking water storage tank such that there is no further need to bring in raw water for filtration.

If the high water level is not above the predetermined limit, a determination 504 is made as to whether the head level in the filtering column is above a predetermined limit. The head is defined as the level of screened raw water above the top of the filter media. If the head level is not above the predetermined limit, a determination 506 is made whether or not it is a certain time, for example, 2:00 A.M. If it is not 2:00 A.M. or other predetermined off-peak time, filtration 508 can begin or resume.

A determination 510 can then be made as to whether the flow rate of the screened raw water is at the desired level. If the system is operating at too high or too low of a flow rate, the opening in the system flow controller is adjusted 512 accordingly. Once this adjustment 512 is made, or if the system was already operating at the desired level, a determination 514 is then made as to whether the low water level is below a predetermined limit. The predetermined low limit is a level of drinking water which is relatively low in the drinking water storage tank such that there is a need to bring in raw water once again (or continue to bring in raw water) from the water source since the supply of drinking water is low because the system has just started operations or because the supply has been reduced through usage.

If the low water level is not below the predetermined limit, the determination 504 regarding the head level is again made so that a backwash step can be carried out if needed. If the head level in the filtering column is above the predetermined limit, a determination 516 is made as to whether the water treatment system is in the filtration mode (vs. the recirculation mode). If it is in the filtration mode, the inlet valve from the source is closed 518 at about the same time, preferably simultaneously, as the recirculation valve to the tank is opened 520. If the system is not in the filtration mode (i.e., it is in the recirculation mode) or after the recirculation valve has been opened 520, the air compressor is turned on 522 at the same time that the backwash air valve is opened. At about the same time, preferably simultaneously, the service valves to and from the filtering column as well as the valve in the disinfection line are closed. The backwashing step operates 524 for a set time, preferably about 10–12 minutes. Shortly before the end of the backwashing step, preferably about two (2)–four (4) minutes, the air compressor shuts off 526 at about the same time, preferably simultaneously, with the closing of the air valve to eliminate compressed air from the system. The backwashing step ends 528 when the service valves to and from the filtering column are opened.

A determination 514 is again made as to whether the low water level is below the predetermined limit. If it is, the inlet valve from the source is opened 532 at about the same time, preferably simultaneously, with the closing of the recirculation valve to the storage tank and the opening of the disinfection valve in the disinfection line so that filtration using water from the raw water source can begin again.

The determination 502 is again made as to whether the high water level is above the predetermined limit. If it is, the inlet valve from the source is closed 534 at about the same time, preferably simultaneously, with the opening of the recirculation valve to the storage tank so that recirculation can begin. A determination 514 is then made as to whether the low water level is below the predetermined limit, and the process continues as described herein.

The invention will be further described by reference to the following example which is offered in order to further illustrate the present invention and the advantages thereof. This example is in no way meant to be limiting, but merely illustrative.

EXAMPLE

Test Set-Up and Procedure

A small pilot plant was designed, constructed and operated to test the feasibility of using positively-charged filtration media to produce low turbidity and low microbial-containing drinking water without the use of coagulation and flocculation chemicals. The experiment was designed to compare the ability to produce drinking water without the use of coagulation chemicals by using both conventional negatively-charged media and positively-charged media under similar conditions but in separate tests. Runs were conducted using various filter media as described below, using the recirculation mode to filter turbid water placed in the holding tank.

A conventional negatively-charged media tested was silica sand (<1.68 mm>0.42 mm) having a 12×40 mesh size. The silica sand was obtained from the Unifilt Corporation in Zeleinopole, Pa. The positively-charged medias were obtained from Martin-Marietta Magnesia Specialties, Inc. These include Mag Chem® 10 (granular hardburned MgO) having a 12×40 mesh size (<2.0 mm>0.42 mm) and a purity of about 98%, and Mag Chem® P-98 (granular deadburned MgO) in ⅛in. (0.32 cm) screenings (<3.36 mm>0.59 mm),as well as in a fine-grain form (<2.38 mm>~0.17 mm) having a purity of about 98.2%, The silica sand, Mag Chem® 10, and Mag Chem® P-98 (⅛in. (0.32 cm) screenings and fine grain) were each subjected to particle size analysis. A 1000-gram sample of each 12×40 mesh media was separately sieved in a standard particle size shaker through sieves Nos. 10, 16, 20, 30, 40, 50 and pan. The weight of media collected on each sieve and the pan were recorded and the percent smaller than each sieve size being sieved was calculated. Media recovery in the test was between 995 and 1003 grams. The Mag Chem® P-98 was sieved through a sieve nest including Sieves Nos. 4, 8, 10, 16, 20, 25, 30, 40, 50, and pan.

Figure 6:
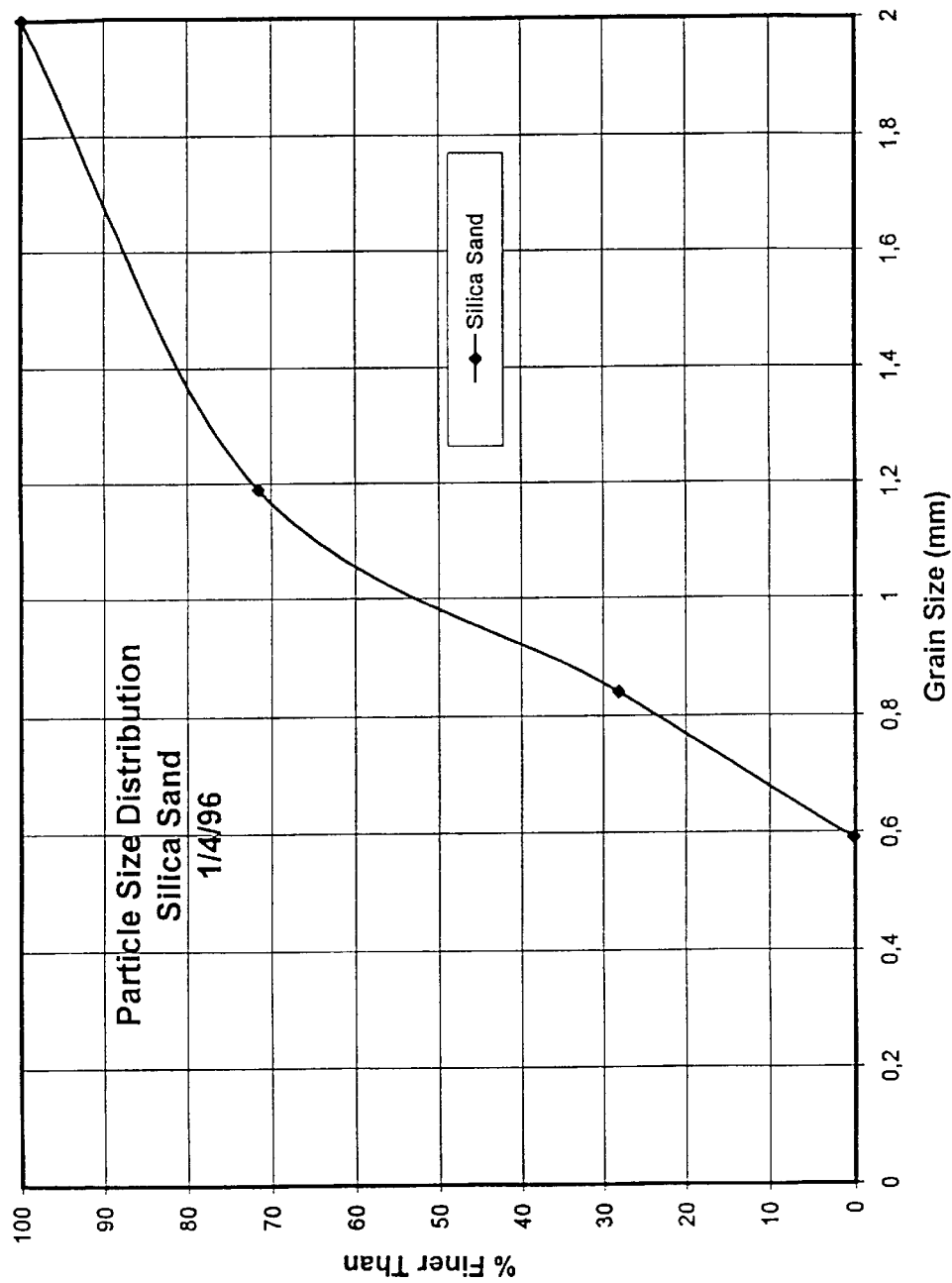
FIGS. 6–8 are graphs showing particle size distribution for silica sand Mag Chem® 10, and Mag Chem® P-98 filter media as described in Example 1 herein.
Figure 7:
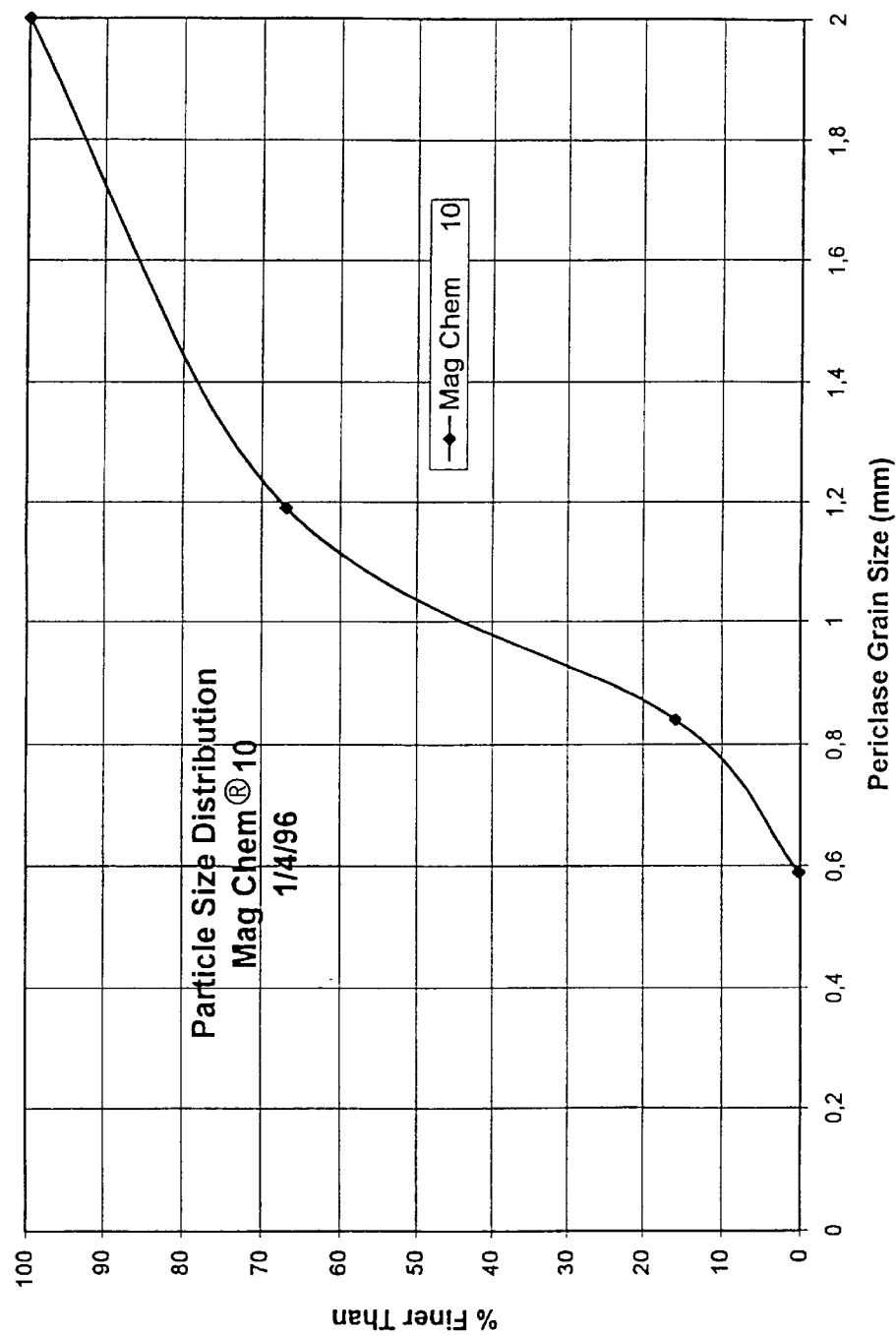
Figure 8:
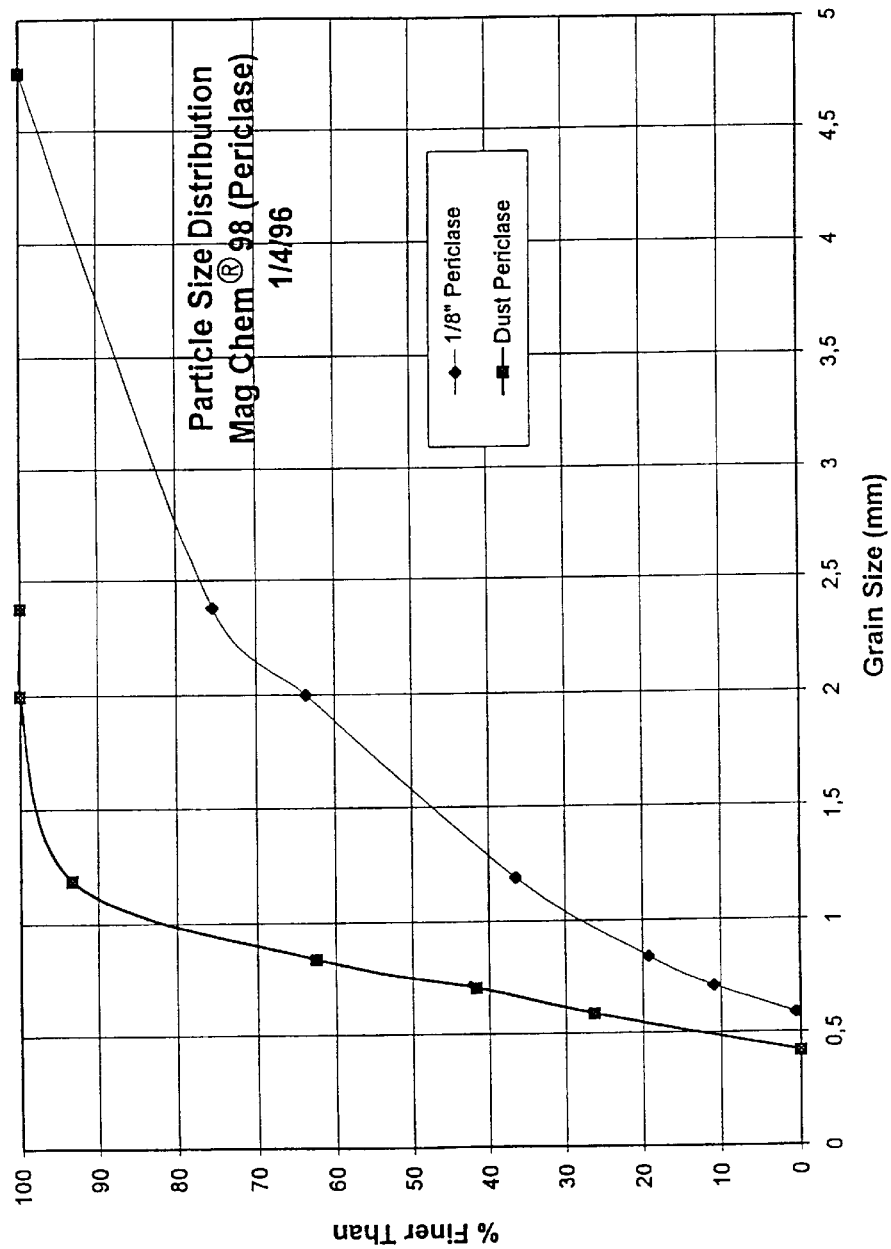

FIGS. 6, 7, and 8 show the particle size distributions of the silica sand, Mag Chem® 10 and Mag Chem® P-98, respectively. Analysis of these results indicated that there were sufficient amounts of each media to be able to test each media with the same size characteristics. Accordingly, the media were sieved in a commercial shaker nest of sieves into the following sizes:

| | |
|---|---|
| Pass Sieve No. 10 | Retain on Sieve No. 16 (<2.0 mm >1.19 mm) |
| Pass Sieve No. 16 | Retain on Sieve No. 20 (<1.19 mm >0.84 mm) |
| Pass Sieve No. 20 | Retain on Sieve No. 30 (<0.84 mm >0.59 m) |

The media densities (in weight /cm$^3$ divided by the weight /cm$^3$ of water) were found to be: Silica sand=2.58, Mag Chem® 10=3.05, and Mag Chem® P-98 =3.06.

Figure 9:
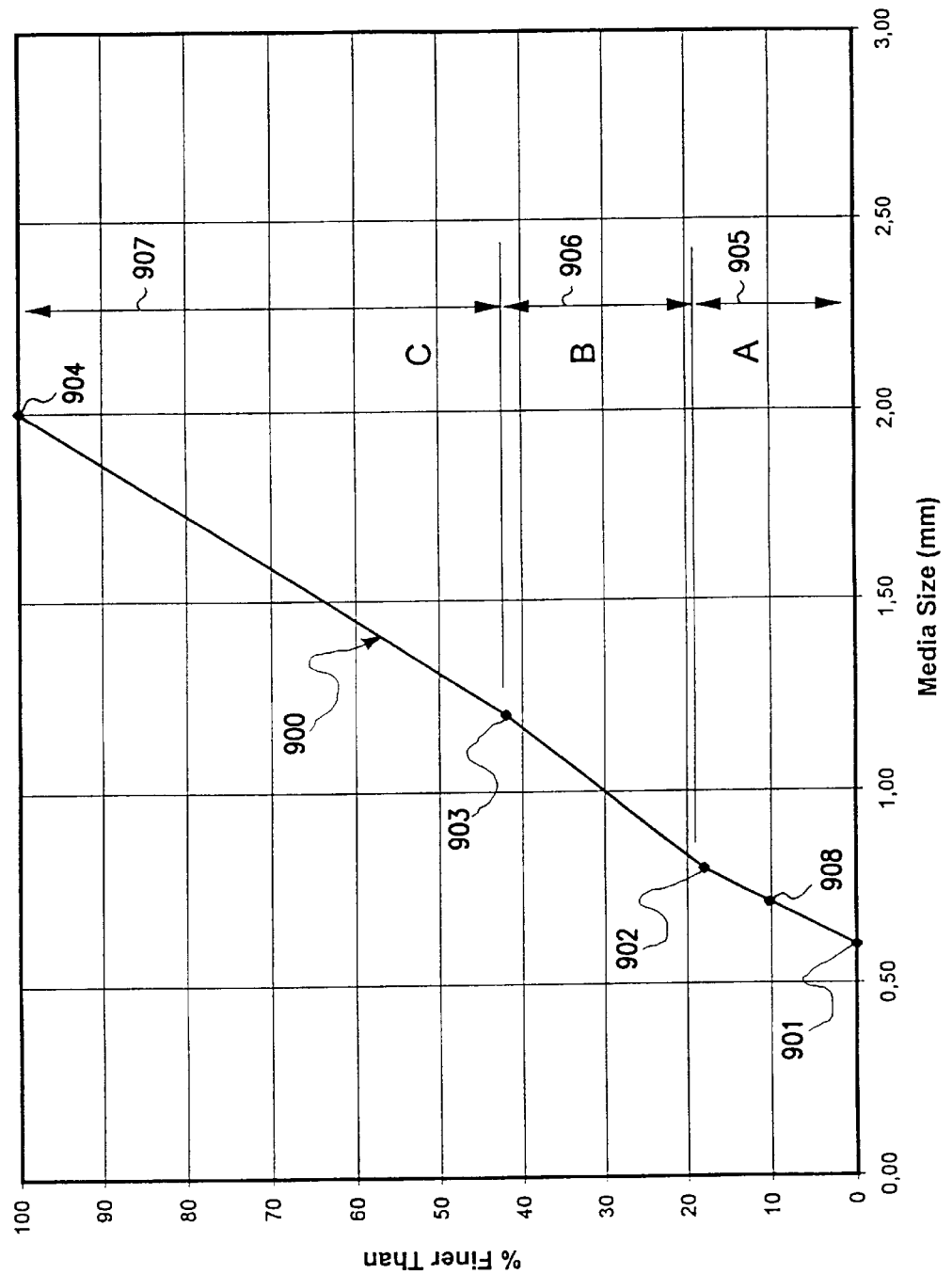
FIG. 9 is a graph showing how the size fractions of media were combined to prepare a filter media for the rapid deep-bed filter as described in the Example herein.

FIG. 9 is a graph showing how the size fractions of media were combined to prepare a filter media for the rapid deep-bed filter. Specifically, it is a plot of one media combination with media size in millimeters versus the % of media finer than the media sized being sieved. The range of the three media sizes into which the media were sieved (<2.0 mm>1.19 mm, <1.19 mm>0.84 mm, and <0.84 mm>0.59 mm), were plotted on line 900, which is an approximate straight line drawn through points 901–904. Point 901 (0.6, 0) represents that about zero (0) % of the media is smaller than the 0.59 mm media. Point 902 (0.85, 17.5) represents that about 17.5% of the media is smaller than the 0.84 mm media. Point 903 (1.4, 42) represents that about 42% of the media is smaller than the 1.19 mm media. Point 904 (2,100) represents that about 100% of the media is smaller than the two (2) mm media, i.e., all of the media is less than two (2) mm.

FIG. 9 shows that distance A 906, therefore, includes all media having a 20×36 mesh, distance B 907 includes all media having a 16×20 mesh, and distance C 908 includes all media having a 10×16 mesh. In this pilot plant, i.e. a media effective size (e) of 0.74 mm and a uniformity coefficient (UC) (60% size/10% size) of 1.95 was desired to achieve a satisfactory media graduation in the filter. The media size such that 10% by weight is small than that size is called the effective media size, in this case approximately 0.74 mm as shown on FIG. 9, point 908 (0.74, 10). To achieve a media effective size of 0.74 mm, the three depths were added to obtain the desired 122 cm (48 in.) media depth which was determined to be a suitable depth:

| Distance × mesh × depth cm (in.) = cm (in.) | | |
|---|---|---|
| A (17.5%–0%) = 17.5% | (20 × 30) | 122 (48) = 21  (8.40) |
| B (42%–17%) = 24.5% | (16 × 20) | 122 (48) = 30 (11.76) |
| C (100%—42%) = 58% | (10 × 16) | 122 (48) = <u>71(27.84)</u> |
| | | Total 122 (48) |

(For simplicity, all media were assumed to have essentially the same density).

Run 1 was completed using silica sand and Run 2 was completed using Mag Chem® P-98 in the above-described combination. Each media was placed in separate filtering columns which had similar physical characteristics as described below. Only one filtering column was run at a time.

The pilot plant components used to conduct the preliminary studies included a stainless simulated drinking water storage tank and backwash water storage tank. Each tank was about one (1) meter (three (3) ft) deep with about a 0.75 meter (2.5 ft) diameter, and had a useful volume of about 380 liters (102 gallons). A deep-bed granular media gravity filter was used in a filtering column having about a ten (10) cm (four (4) in) diameter which was about 2.8 meters (nine (9) feet) high, having an area of about 81 cm$^2$ (0.0873 ft$^2$). The filtration rate used was about 12 m$^3$ /hr/m$^2$ or about 1.4 liters/min (about 5 gallons/min/ft$^2$ or 0.44 gpm). A scale was mounted along the height of the filter column to measure the water height as the head above the media increased during a filter run.

Other components included a Neptune Model B3.0 electric motor open-drum mixer, 115–230V, ½horsepower (HP) from Grainger @ in Des Moines, a Division of W. W. Grainger, Inc., to mix the clay which was added to the water in the simulated water storage tank to create turbidity. Also used was a Teel ⅙HP submersible drainage pump (Model No. 1P914) from Grainger® with a capacity of about 1,320 gph@ a three (3) foot head (5,000 L/hr (a 0.9 meter head) which was used as the supply pump to supply water from the water storage tank to the filter. The filtered water was returned continuously to the water storage tank. A Teel ½HP submersible centrifugal pump (Model No. 1P8094), also from Grainger®, was used as the backwash pump to supply clean water from the backwash water storage tank for backwashing the filter. A Hach 2100N ratio turbidimeter and primary standards were purchased, calibrated, and used to measure the water turbidity in the water storage tank and in the effluent from the filter. A new pH polygel combo electrode (Model 13-620-108, Fisher Scientific) was used with an Accumet pH meter to measure the pH of water samples.

The operating method used involved using the drinking water storage tank both as the raw water source and as the receiver of the filtered water. The amount of water used was approximately 0.4 m$^3$ (100 gallons). As the filtered water was returned to the tank, the raw water source became less and less turbid. Turbidity was measured in NTU both in the tank, where the water was continually mixed with the drum mixer, and where the water entered the tank from the filtering column as filtering column effluent.

Since the tank contained about 0.4 m$^3$ (100 gallons) of turbid water and was filtered at a rate of about 1.4 L/min (0.36 gpm), approximately 277 minutes (4.63 hrs) were required to filter the tank contents once. Since the water in the storage tank would have to be recycled through the filter about seven (7) or eight (8) times to reduce the water turbidity close to that of the filter effluent (or about 32–37 hours), the system was therefore expected to have to be operated continuously for several days to evaluate system performance.

Performance was evaluated qualitatively and quantitatively in three ways: By the level of the turbidity of the filtered water as a function of time as compared with other media and as compared with WHO drinking water standards; by the time it took for the turbidity of the water in the drinking water storage tank to be reduced to a value of 0.5 NTU (or less); and by the rate of headloss increase over time.

Accordingly, a standard procedure was adopted for conducting Runs 1 and 2 which included cleaning both the simulated drinking water storage tank and the backwash water storage tank and filling them both with tap water (a lime-softened water with a normal pH of about 9.3–9.5). The filter was then backwashed for a period of ten (10) minutes using a water flow sufficient to provide about 20 percent expansion of the media at the same time that compressed air also entered the bottom of the filter at a rate of about 1.5 $m^3/min/m^2$ (three (3) $CFM/ft^2$). After ten minutes of simultaneous air-water backwash, the air was shut off and water backwash was continued for two (2) to three (3) minutes until all the visible air bubbles were removed from the media. The filter was then shut down and left full of backwash water to a level several inches above the sand surface. Kentucky Ball clay, a commercially-available clay, was added over a period of several minutes to the simulated drinking water storage tank in a concentration of about 59 mg/L (22.3 grams) to provide a water turbidity of about 40 NTU. At all times, the drum mixer was used to mix the contents of the tank to provide a uniform tank water turbidity. Mixing was continued throughout the subsequent test run.

After about 15 minutes of mixing the contents of the simulated drinking water storage tank, Run 1 was commenced. The submerged supply pump was started and pumped water through a rotameter, which was calibrated at a constant controlled rate of about 12 $m^3/hr/m^2$ or about 1.4 liters/min (4.12 $gpm/ft^2$). The calibration is shown on the Filtering Media Data Collection Chart in Table 1 below as percent (%) of maximum flow and the associated flow in liters per minute (and gallons per minute). The pump directed the flow at the top of the filter against the inside wall of the filtering column in service. The water was allowed to exit the filtering column and was returned to the simulated drinking water storage tank containing the clay suspension. The time of the start of the run was associated with the point when water left the filtering column to reenter the storage tank plus two (2) to three (3) minutes which gave time for the flow to reach the 1.4 L/min (4.12 $gpm/ft^2$) rate and the head to come to a steady level.

During the first several hours, measurements were taken and recorded for time and turbidity in water entering the tank from the filtering column, turbidity of the water in the simulated drinking water storage tank, and the level of the head in the filtering column at intervals of 15 minutes, then 30 minutes, and then hourly. After ten (10) hours of run time, such measurements were made at convenient times. Other variables could have been monitored including the pH and temperature of the water being mixed, pumped and recycled.

After the water in the simulated drinking water storage tank and the filtering column effluent reached an equilibrium condition, or after the turbidity levels recorded in the storage tank were below about 0.2 NTU, the runs were terminated.

In Runs 1 and 2 using silica sand and Mag Chem® P-98 respectively, the filters did not show a major increase in headloss even after 24 hours of operation, in which most of the 22 +grams of Kentucky Ball clay was retained in the filter. In view of this, the runs were not interrupted, but another 22.3 grams of clay was added to the simulated drinking water storage tank to once more increase the turbidity level going to the filtering columns. The system operations were then continued until the water turbidity in the simulated drinking water storage tank was again at a low level or until a headloss was generated through the media suggesting the run should be terminated.

Test Results

Run 1

The results of Run 1 using silica sand media and no chemical pretreatment are shown in Table 1 below and in FIGS. 10, 11, and 12. Table 1 shows the data collected during Run 1 using silica sand as the filter media. Note that the turbidity of the simulated drinking water storage tank water in Tank 1 started at 25 NTU and increased over the first 1¼ hours to 27 NTU. This increase may have been related to the particular method used for adding the clay to the water in the storage tank. Some low-turbidity water in the piping system and filter column served to keep the tank water turbidity from reaching an equilibrium turbidity level for about one (1) hour. The NTU then decreased steadily to a low of 0.1 NTU after 48 hours of operation. Simultaneously, the water turbidity from the silica sand filter media, which is listed as filter 2, varied between 7.0 NTU and 10.5 NTU for the first hour, and then decreased uniformly to 0.1 NTU after 51.8 hours.

TABLE 1

Test Results Using Silica Sand/Media
FILTERING MEDIA DATA COLLECTION CHART

| DATE 01/15/96 CLOCK TIME | RUN NUMBER 1 ELAPSED TIME, hrs. | FLOW RATE, % max flow | TANK 1 NTU | FILTER 1 NTU | FILTER 2 NTU | FILTER LEVEL - 2 Cm. | In. |
|---|---|---|---|---|---|---|---|
| 11:30 AM | 0.00 | 50 | 25.0 | | 0.8 | 160.0 | 63.00 |
| 11:45 AM | 0.25 | 48 | 27.0 | | 7.5 | 181.6 | 71.50 |
| 12:00 PM | 0.50 | 48 | 27.0 | | 7.0 | 179.1 | 70.50 |
| 12:15 PM | 0.75 | 49 | 27.0 | | 7.0 | 181.6 | 71.50 |
| 12:30 PM | 1.00 | 50 | 27.0 | | 6.5 | 179.1 | 70.50 |
| 12:45 PM | 1.25 | 49 | 27.0 | | 8.0 | 177.8 | 70.00 |
| 01:00 PM | 1.50 | 50 | 25.5 | | 7.0 | 177.8 | 70.00 |
| 01:15 PM | 1.75 | 48 | 25.5 | | 8.0 | 176.5 | 69.50 |
| 01:30 PM | 2.00 | 50 | 25.5 | | 8.0 | 176.5 | 69.50 |
| 02:00 PM | 2.50 | 49 | 23.5 | | 10.5 | 175.3 | 69.00 |
| 03:00 PM | 3.50 | 46 | 22.0 | | 10.0 | 172.7 | 68.00 |
| 04:00 PM | 4.50 | 48 | 20.0 | | 8.0 | 171.5 | 67.50 |
| 05:00 PM | 5.50 | 50 | 17.5 | | 7.5 | 170.2 | 67.00 |
| 08:30 PM | 9.00 | 38 | 11.5 | | 4.8 | 167.6 | 66.00 |
| 11:00 PM | 11.60 | 50 | 7.0 | | 5.0 | 167.0 | 65.75 |
| 07:45 AM | 20.25 | 46 | 2.6 | | 0.9 | 170.2 | 67.00 |

TABLE 1-continued

Test Results Using Silica Sand/Media
FILTERING MEDIA DATA COLLECTION CHART

| | | | | | | |
|---|---|---|---|---|---|---|
| 09:00 AM | 21.50 | 50 | 2.2 | 0.8 | 170.2 | 67.00 |
| 10:00 AM | 22.50 | 50 | 1.8 | 0.6 | 170.2 | 67.00 |
| 12:00 PM | 24.50 | 50 | 1.4 | 0.6 | 169.5 | 66.75 |
| 02:00 PM | 26.5O | 50 | 0.9 | 0.4 | 170.8 | 67.25 |
| 04:00 PM | 26.5O | 50 | 0.8 | 0.3 | 170.2 | 67.00 |
| 05:00 PM | 29.50 | 50 | 0.7 | 0.3 | 170.2 | 67.00 |
| 11:00 PM | 35.50 | 50 | 0.3 | 0.2 | 168.3 | 66.25 |
| 09:05 AM | 45.50 | 50 | 0.1 | 0.1 | 170.8 | 67.25 |
| 03:20 PM | S1.80 | 50 | 0.2 | 0.1 | 170.2 | 67.00 |
| 03:30 PM | 52.00 | 50 | 42.00 | 3.97 | 170.2 | 67.00 |
| 04:00 PM | 52.50 | 50 | 48.40 | 12.40 | 171.5 | 67.50 |
| 05:00 PM | 53.50 | 50 | 45.40 | 12.90 | 171.5 | 67.50 |
| 10:45 PM | 59.25 | 50 | 15.30 | 4.03 | 174.0 | 68.5O |
| 08:10 AM | 68.60 | 50 | 2.30 | 1.75 | 176.5 | 69.50 |
| 10:30 AM | 71.00 | 50 | 1.58 | 0.59 | 175.3 | 69.00 |
| 11:45 AM | 72.25 | 50 | 1.23 | 0.40 | 176.5 | 69.50 |
| 02:15 PM | 74.75 | 50 | 0.80 | 0.27 | 177.2 | 69.75 |
| SHUT THE SYSTEM DOWN | | | | | | |

| | % Max Flow | gal/min | L/min | Filter Media | Filter Media |
|---|---|---|---|---|---|
| To convert flow rate from | 10% | 0.07 | 0.26 | In Filter 1 | In Filter 2 |
| % max flow to gal/min | 20% | 0.14 | 0.53 | | Silica Sand |
| | 30% | 0.22 | 0.83 | | |
| | 40% | 0.29 | 1.10 | | |
| | 50% | 0.36 | 1.36 | | |
| | 60% | 0.42 | 1.59 | | |
| | 70% | 0.50 | 1.89 | | |
| | 80% | 0.57 | 2.16 | | |
| | 90% | 0.67 | 2.54 | | |

When the turbidity in the storage tank was increased by addition of more Kentucky Ball clay at 51.8 hours, the turbidity in the tank increased to 48.4 NTU after ½ hour and the filtering column effluent turbidity increased to over 12 NTU. Both decreased as a function of time thereafter. There was an unexplained increase in head in the first few minutes of operation which decreased over a period of 10 hours after which the head increased only a few inches after over 60 more hours of filtration.

Figure 10:
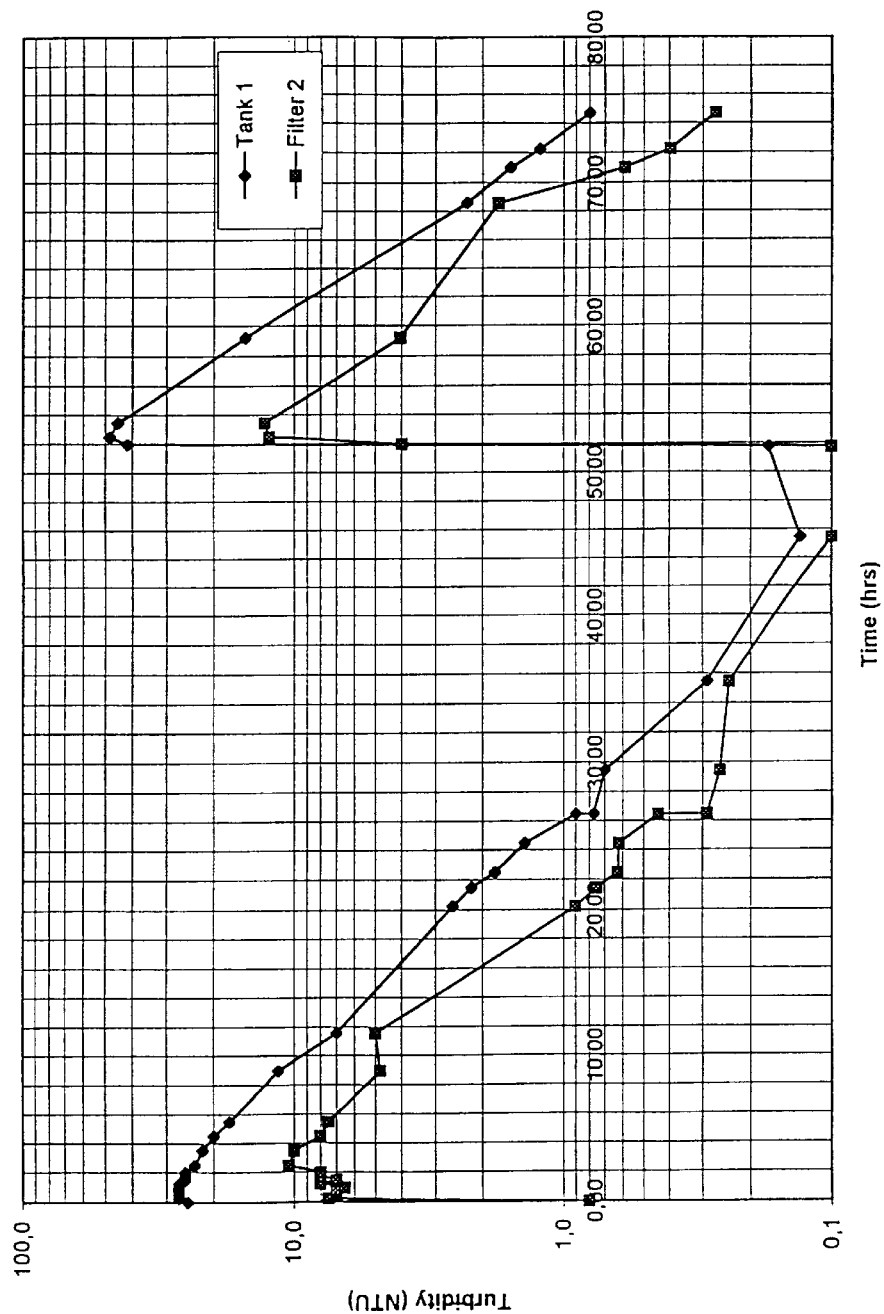
FIGS. 10–11 are graphs showing turbidity in nephelometric turbidity units (NTU) versus time in hours using silica sand as the filter media as described in the Example herein.

FIG. 10 shows the Table 1 results plotted on a semi logarithmic graph to highlight the changes in water turbidity with time. The graph of turbidity in the storage tank and in the filtering column effluent consistently parallel each other. Note that it took 20 hours of operation to reduce the turbidity of the filtrate below one (1) NTU and over 26 hours of operation before the storage tank water turbidity was below one (1) NTU. In the second half of Run 1, it took 18 hours for the filter effluent turbidity to drop below one (1) NTU and about 23 hours for the tank water turbidity to drop below one (1) NTU. FIG. 11 shows the same data plotted on an arithmetic graph.

Figure 11:
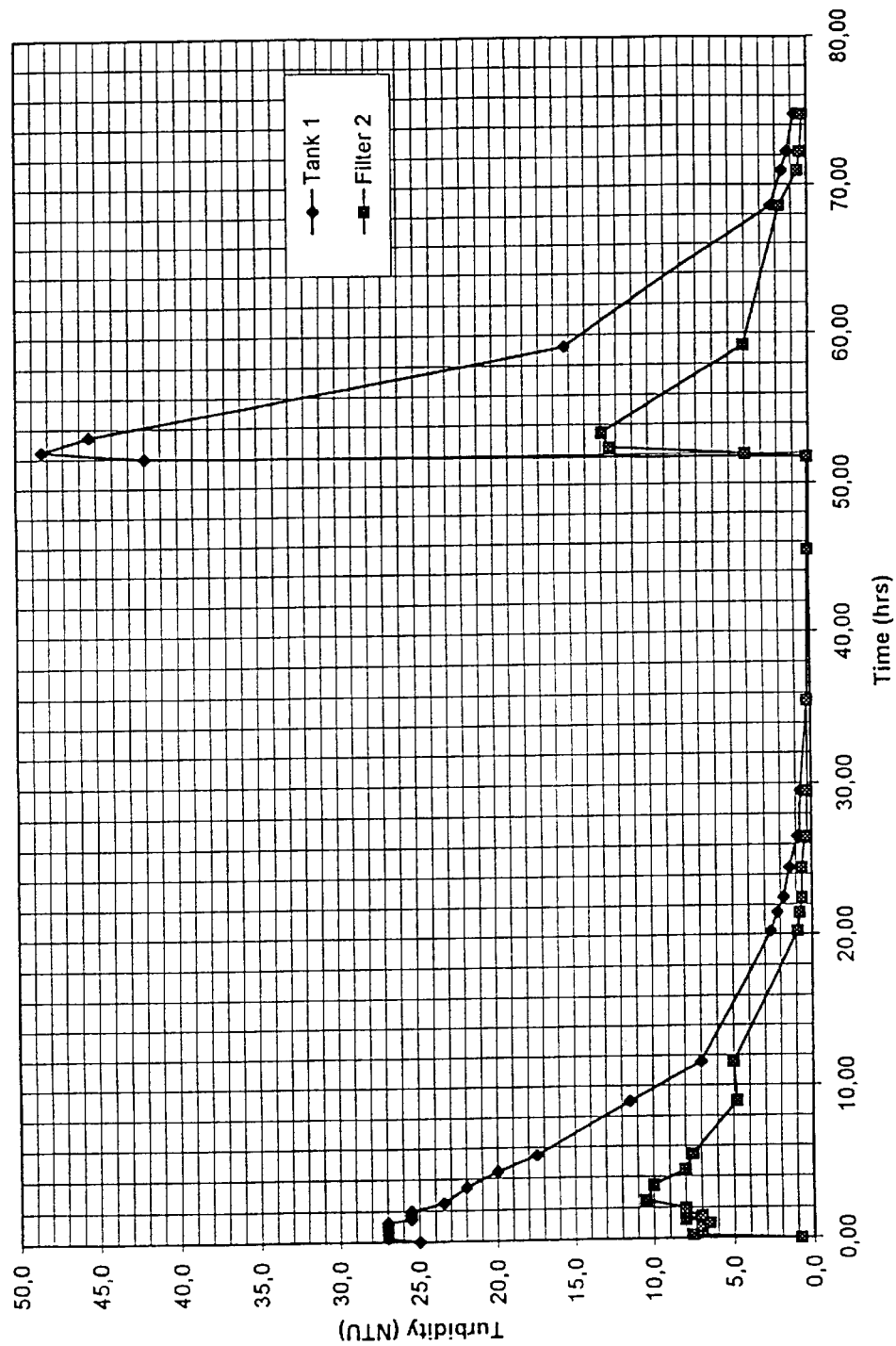
Figure 12:
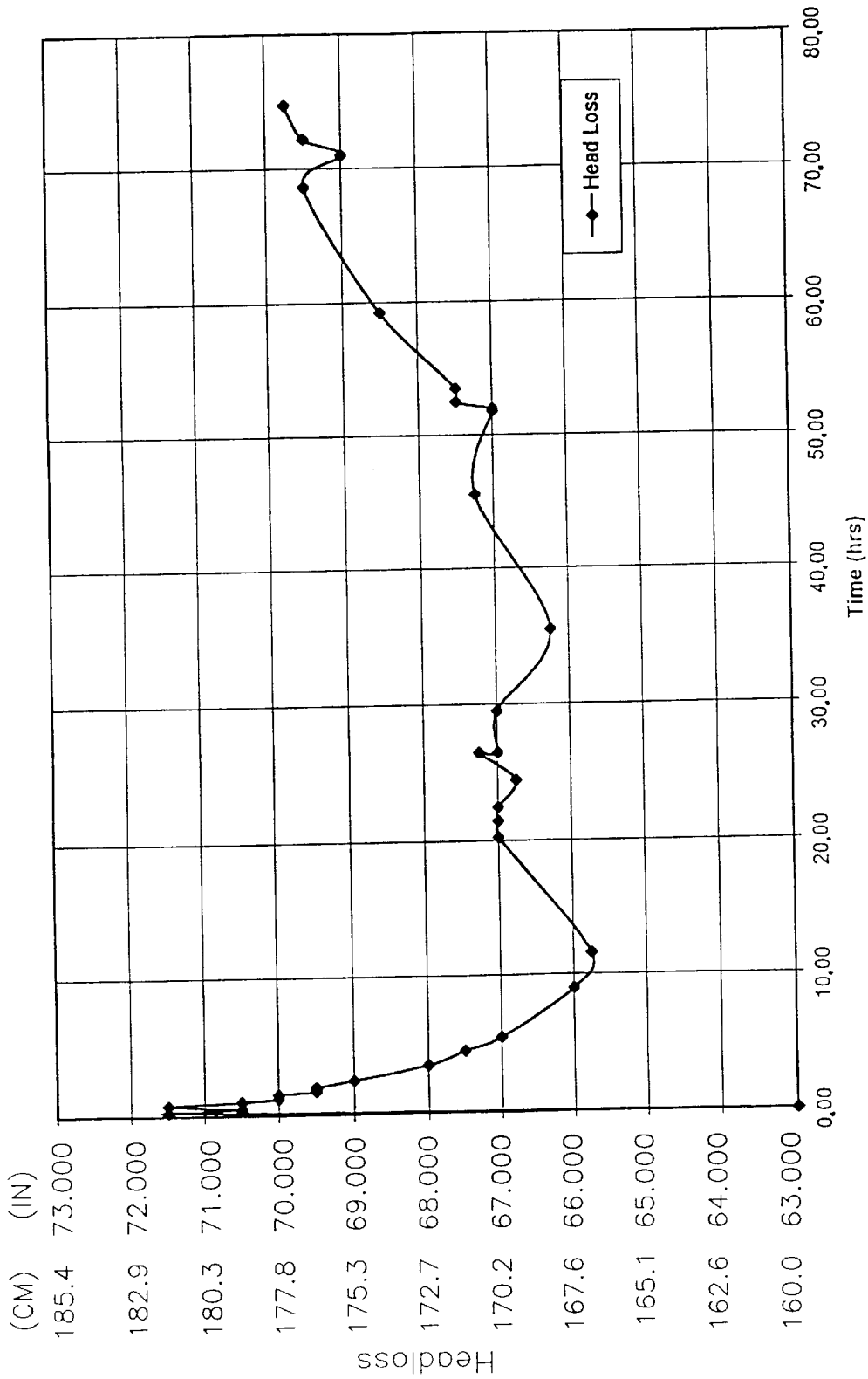
FIG. 12 is a graph showing the increase in the head above the silica sand filter media versus time in hours as described in the Example herein.

FIG. 11 shows the plot of headloss versus time. The measurements for heads or level of water above the filter media are approximate due to the splashing of the water entering the filtering column. One should also note that the raw water turbidity was decreasing with time and a constant solids load to the filter were not possible, since the suspended solids in the storage tank were continuously decreasing.

The results of Run 1 indicate that silica sand media is not a satisfactory media for providing drinking water quality filtrate in only a single pass through the filtering column without chemical pretreatment of the water to be filtered. The concept of recirculation of water through the silica sand filter even without chemical pretreatment has merit, since the turbidity ultimately was reduced to meet drinking water standards. However, recirculation of water was required since the filter was only removing about two-thirds of the turbidity supplied to it for over 20 hours. FIG. 12 indicates that the total headloss through the filter increased by only about 13 cm (five (5) inches) yet removed over 42 grams of Kentucky Ball clay from the water. Since the static, non-operating head was about 133 cm (52.5 inches), the total read required, including headloss through the clean media, was only about 46 cm (18 inches). This result indicates that a suitable total operating head would be about 1.5 meters (five (5) feet).

Run 2.

Figure 14:
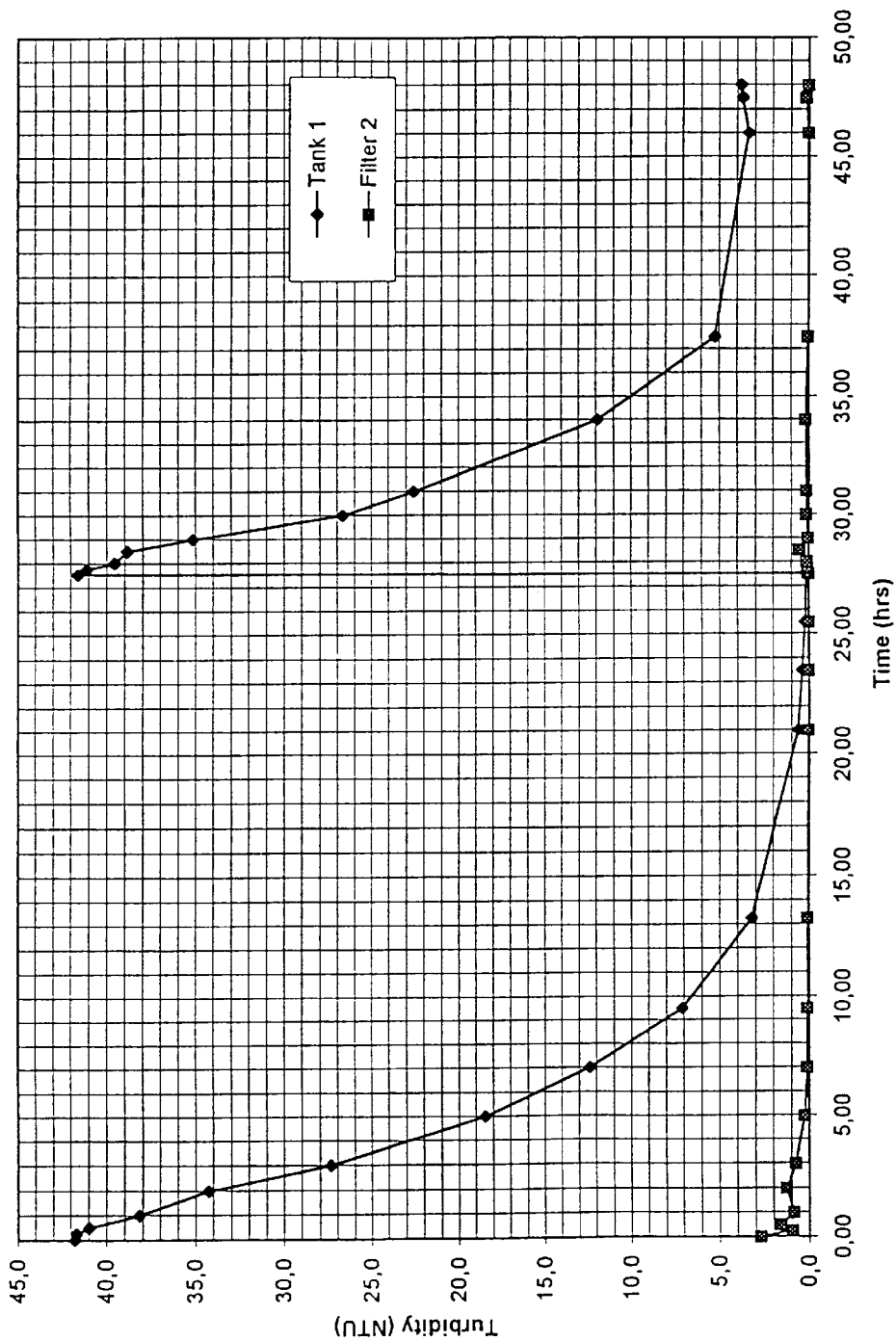
Figure 15:
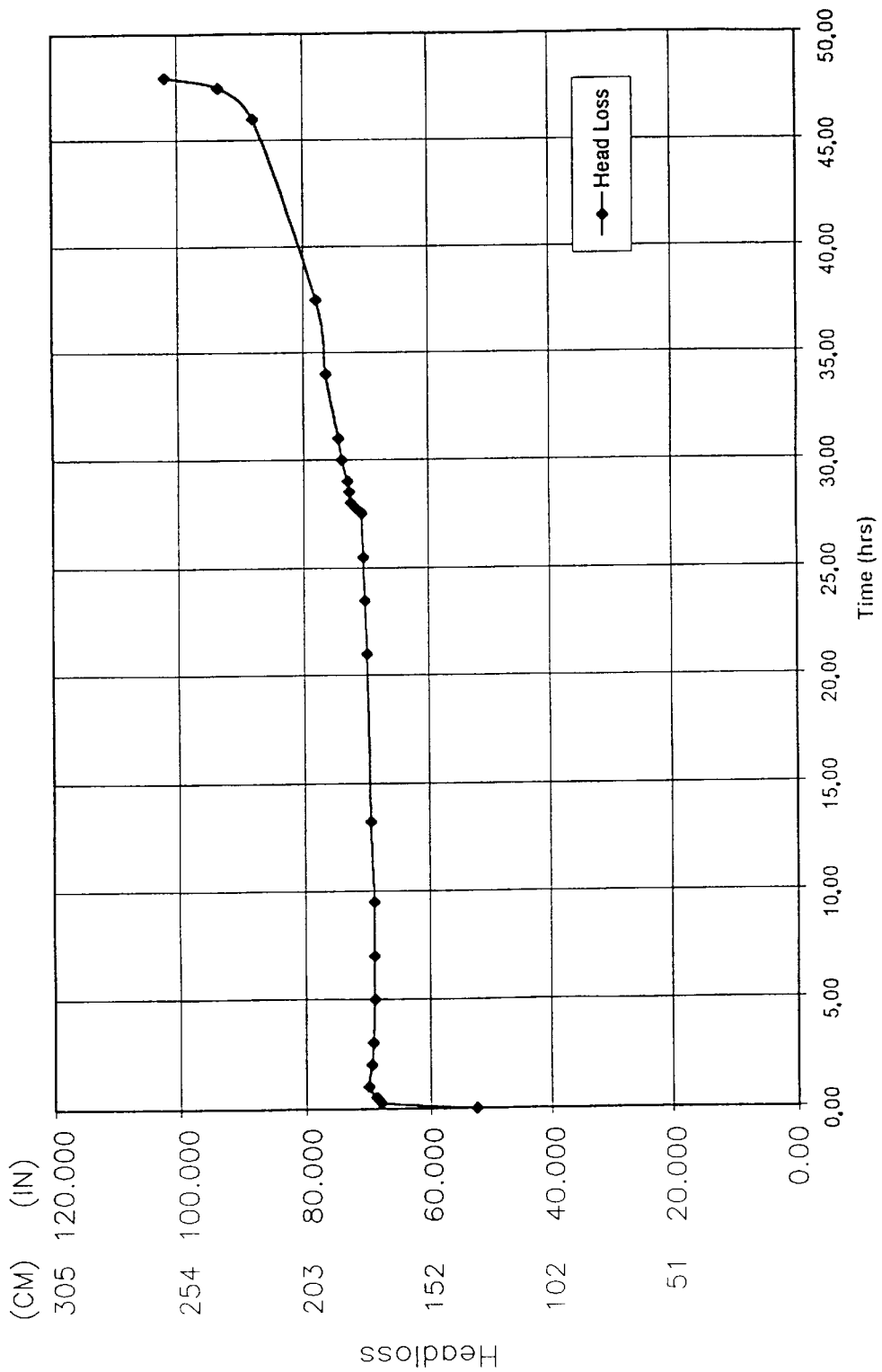
FIG. 15 is a graph showing the increase in the head above the Mag Chem® P-98 filter media versus time in hours as described in the Example herein.

Run 2 was operated under the same conditions as Run 1, except for the use of Mag Chem® P-98 media (periclase) instead of silica sand. The operating experience gained in Run 1 was helpful, such as the need to add the clay in a uniform slurry over a longer time and to mix the contents in. The results of Run 2 are shown in Table 2 below and FIGS. 13, 14, and 15.

Figure 13:
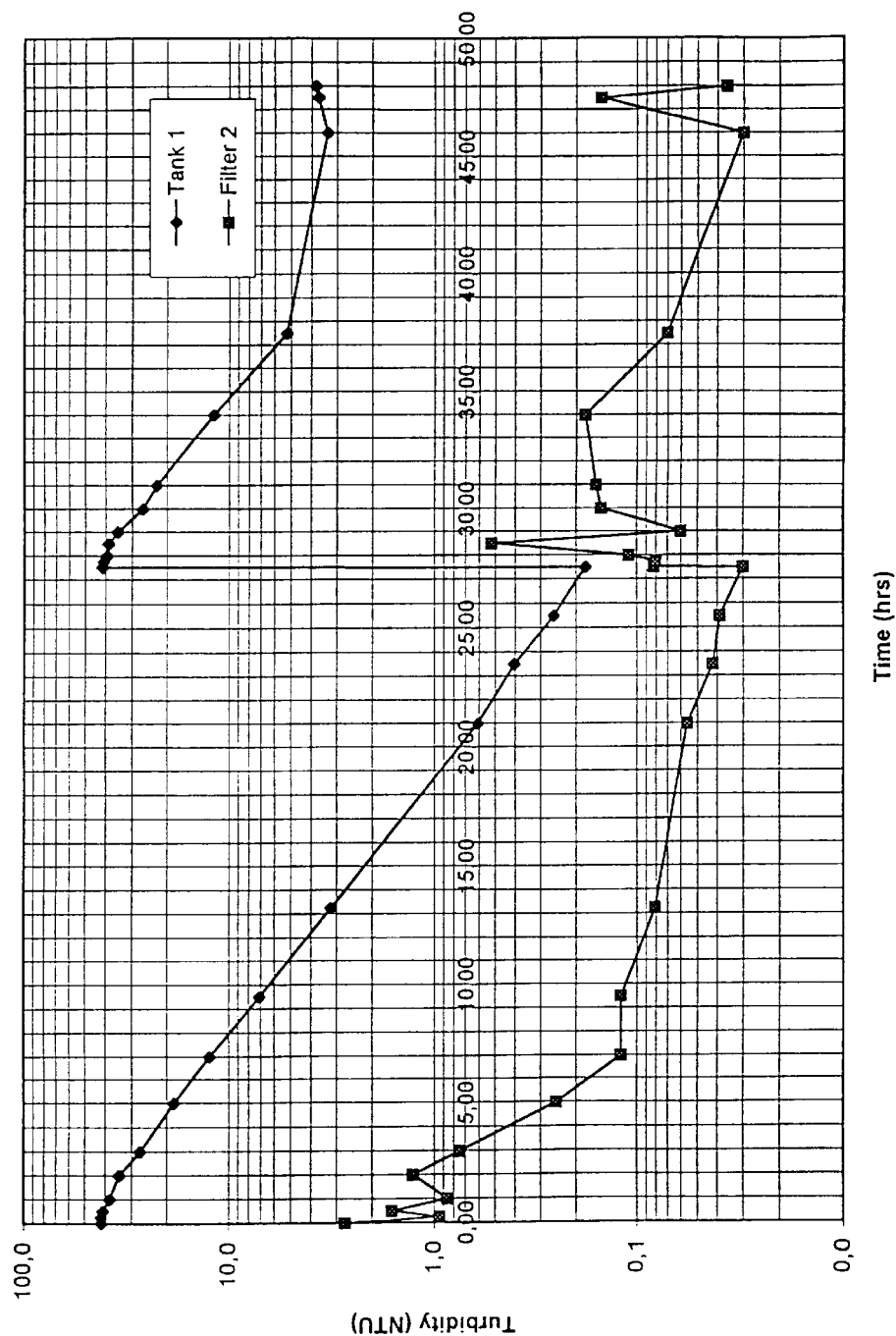
FIGS. 13–14 are graphs showing turbidity in NTU versus time in hours using Mag Chem® P-98 as the filter media as described in the Example herein.

Table 2 and FIG. 13 clearly show the very significant improvement in the proposed system capability when using Mag Chem® P-98 media without chemical pretreatment of the water being filtered. Specific observations of special interest include the fact that the addition of Kentucky Ball clay (22.3 grams) at the start of the run and again after 27.5 hours of operation brought a consistent turbidity in the simulated drinking water storage tank of about 41.6–41.8 NTU. The effluent turbidity from the filtering column, referred to as Filter 1 in Table 2 was a maximum of 2.72 NTU at the start of filtration and decreased fairly consistently thereafter. The inconsistent readings of 1.6 NTU and 1.26 NTU after 0.5 and 2 hours of operation, respectively, can be explained because of the mixing of clean water in the filtering system, including the filtering column, with the turbid water in the storage tank. Time is required to distribute the turbidity throughout the water to achieve an equilibrium condition.

next 10.5 hours of operation was accompanied by another 61 cm (24-inch) rise in the water level above the filter media. In fact, this rise resulted in the shutdown of the run.

TABLE 2

Test Results Using Mag Chem ® P-98 Media (Periclase).
FILTERING MEDIA DATA COLLECTION CHART

| DATE 01/25/96 CLOCK TIME | RUN NUMBER 2 ELAPSED TIME, hrs. | FLOW RATE, % max flow | TANK 1 NTU | FILTER 1 NTU | FILTER 2 NTU | FILTER LEVEL - 1 Cm. | In. |
|---|---|---|---|---|---|---|---|
| 10:00 AM | 0.00 | 50 | 41.8 | 2.72 | | 52.50 | 133.4 |
| 10:15 AM | 0.25 | 50 | 41.7 | 0.94 | | 68.00 | 172.7 |
| 10:30 AM | 0.50 | 50 | 41.0 | 1.6 | | 68.75 | 174.6 |
| 11:00 AM | 1.00 | 50 | 38.2 | 0.86 | | 70.00 | 177.8 |
| 12:00 PM | 2.00 | 50 | 34.3 | 1.26 | | 69.50 | 176.5 |
| 01:00 PM | 3.00 | 50 | 27.4 | 0.75 | | 69.25 | 175.9 |
| 03:00 PM | 5.00 | 50 | 18.5 | 0.25 | | 69.00 | 175.3 |
| 05:00 PM | 7.00 | 50 | 12.4 | 0.12 | | 69.00 | 175.3 |
| 07:30 PM | 9.50 | 50 | 7.10 | 0.12 | | 69.00 | 175.3 |
| 11:15 PM | 13.25 | 50 | 3.22 | 0.081 | | 69.50 | 176.5 |
| 07:00 AM | 21.00 | 50 | 0.61 | 0.056 | | 70.00 | 177.8 |
| 09:30 AM | 23.50 | 50 | 0.41 | 0.042 | | 70.25 | 178.4 |
| 11:30 AM | 25.50 | 50 | 0.26 | 0.039 | | 70.50 | 179.1 |
| 01:30 PM | 27.50 | 50 | 0.18 | 0.03 | | 70.75 | 179.7 |
| 01:32 PM | 27.53 | 50 | 41.60 | 0.082 | | 70.75 | 179.7 |
| 01:45 PM | 27.75 | 50 | 41.10 | 0.08 | | 71.75 | 181.0 |
| 02:00 PM | 28.00 | 50 | 39.60 | 0.11 | | 72.50 | 184.2 |
| 02:30 PM | 28.50 | 50 | 38.90 | 0.52 | | 72.75 | 184.8 |
| 03:00 PM | 29.00 | 50 | 35.20 | 0.06 | | 73.00 | 185.4 |
| 04:00 PM | 30.00 | 50 | 26.70 | 0.15 | | 74.00 | 188.0 |
| 05:00 PM | 31.00 | 50 | 22.60 | 0.16 | | 74.50 | 189.2 |
| 08:00 PM | 34.00 | 50 | 11.90 | 0.18 | | 76.50 | 194.3 |
| 11:30 PM | 37.50 | 50 | 5.24 | 0.07 | | 78.00 | 198.1 |
| 08:00 AM | 46.00 | 46 | 3.36 | 0.03 | | 88.00 | 223.5 |
| 09:30 AM | 47.50 | 50 | 3.70 | 0.15 | | 93.50 | 237.5 |
| 10:00 AM | 48.00 | 50 | 3.80 | 0.036 | | 102.00 | 259.0 |
| SHUT THE SYSTEM DOWN | | | | | | | |

| | % Max Flow | gal/min | L/min | Filter Media | Filter Media |
|---|---|---|---|---|---|
| To convert flow rate from | 10% | 0.07 | 0.26 | In Filter 1 | In Filter 2 |
| % max flow to gal/min | 20% | 0.14 | 0.53 | Periclase | Silica Sand |
| | 30% | 0.22 | 0.83 | (in use) | (not in use) |
| | 40% | 0.29 | 1.10 | | |
| | 50% | 0.36 | 1.36 | | |
| | 60% | 0.42 | 1.59 | | |
| | 70% | 0.50 | 1.89 | | |
| | 80% | 0.57 | 2.16 | | |
| | 90% | 0.67 | 2.54 | | |

Otherwise, all readings thereafter were under about one (1) NTU. Typically, even with chemically pretreated water being filtered, the first ½–1 hour of filtered water will be filtered to waste since it frequently exceeds desired drinking water quality. This amount of time can be reduced by use of deeper beds or finer media.

The Mag Chem® P-98 (periclase) filter media produced water turbidities less than 0.5 NTU for a period over 45 hours during the 48-hour run even though the raw water turbidity was increased to 41.6 NTU again after 27.5 hours of operation. Furthermore, this media generated filtrate after 48 hours of operation over both periods of high turbidity with an average turbidity of less than 0.1 NTU.

Also, the initial headloss through the Mag Chem® P-98 filter media was 41 cm (16 inches) of water. During the first 27.5 hours of filtration, the head increase needed for filtration was only about 5.6 cm (2.2 inches). In the next ten hours after she turbidity in the simulated drinking water tank was increased again to 41.6 NTU, the headloss increased another 18.4 cm (7.25 inches). After 37.5 hours of operation, the The results to date confirm the hypotheses that positively-charged media can adequately reduce the turbidity of highly-turbid water without the use of chemical coagulants. Thus, the process of the present invention would find excellent application as a simple-to-operate portable water treatment system in developing countries as well as in other drinking water applications. The use of both a positively-charged periclase media, such as Mag Chem® P-98, and the recycle or recirculation component of the water treatment system have major drinking water treatment advantages as discussed herein.

Further runs performed under the same test conditions as described above have shown that the turbidity of water having much higher initial turbidity levels can also be reduced using Mag Chem® P-98 (periclase) as the filter media. Specifically, water with turbidities of 50 NTU, 130 NTU and 230 NTU were reduced to less than about 0.5 NTU with Mag Chem® P-98 (periclase) as the filter media.

In an alternative embodiment, a slightly coarser media can be used which is expected to produce lower headloss than the headloss shown in Runs 1 and 2 of the Example herein. The coarser media can be made deeper than the depth used in the Example, which should produce filtrate clarity equivalent to those used in Runs 1 & 2. For example, 152 cm of slightly coarser media can be used which would have an effective size (e) of 0.97 mm and a lower uniformity coefficient (UC) of 1.59. Only two size gradations of the media would be needed, as follows:

| | |
|---|---|
| (100%–29.5%) = 70.5% × 152.4 cm depth = | 107.4 cm |
| (29.5–0%) = 29.5% × 152.4 cm depth = | 45.0 cm |
| Total | 152.4 cm |

In summary, the continuous process and apparatus of the present invention with a suitably positively-charged media, a recycle or recirculation component (recirculator), preferably followed by a disinfection component (disinfector) and including a backwashing component (backwasher) is advantageous because now safe drinking water can be made using no coagulant chemicals thus providing ease of operation and maintenance. Further, the use of independent sources of energy such as a gas-driven generator or solar power, or a combination of such energy sources allows the system to operate in even the remotest areas. The system has the further advantage of being portable which, along with the other novel features of this invention, makes safe drinking water available to all people worldwide.

Although the present invention has been described in considerable detail with reference to certain preferred versions thereof, other versions are possible. For example, the apparatus of the present invention can be placed on a solid base inside a suitable housing, and the process operated on a larger scale as a permanent distribution system. Such a system would require an adequate power supply such as a grid power system alone or a grid power system in conjunction with a generator back-up. Equipment size, flow rates, disinfectant amounts, daily output of drinking water, and so forth, would also need to be scaled for a larger operation. In an alternative embodiment of the present invention, a suitable positively-charged filter media such as magnesium oxide or aluminum oxide is combined with a layer of sand, and the system is run as a slow sand filtration operation. Since the suspended solids do not penetrate very deep into the filter bed, backwashing is not needed for this type of operation as the filter bed is cleaned by periodically removing the top layer of the sand containing the collected suspended solids.

In yet another alternative embodiment there are at least two filtering columns or at least two drinking water storage tanks.

Therefore, the spirit and scope of the appended claims should not be limited to the description of the preferred embodiments contained herein.

What is claimed is:

1. A process for producing drinking water with a water treatment system comprising the steps of:
   providing an apparatus for producing drinking water comprising a source of mechanical energy for drawing water from a water source into an intake line and releasing the water into the top of a filtering column having a granular filter media located inside;
   filtering water with the granular filter media to produce filtered water having a low turbidity, the granular filter media having a positive electrostatic attraction force for attracting suspended solids from the water, wherein the water has not first been chemically pretreated with a coagulant; and
   purifying the filtered water with a purifier coupled to the filtering column, the purifier having disinfectant for disinfecting the filtered water to produce drinking water.

2. The process as recited in claim 1 further comprising backwashing the filter media in order to dislodge the suspended particles wherein the filter media is cleaned.

3. The process as recited in claim 2 further comprising controlling the water treatment system with a system controller wherein the system controller is coupled to the water treatment system and is responsive to input signals from a high water level sensor and a low water level sensor in a drinking water storage tank, and a maximum head level sensor in the filtering column, such that the controller causes the water treatment system to begin filtering or drawing water in from the water source when the low water level sensor detects a water level in the storage tank below a predetermined minimum level, begin recirculating when the high water level sensor detects a water level in the storage tank above a predetermined maximum level, or begin backwashing when the maximum head level sensor detects a water level above a predetermined maximum high level in the filtering column.

4. The process as recited in claim 3 further comprising timing the backwashing with a timer wherein the water treatment system begins backwashing at a predetermined off-peak time.

5. The process as recited in claim 2 wherein compressed air and water are used to backwash the filter media.

6. The process as recited in claim 1 wherein the disinfectant purifies the filtered water to produce drinking water having a microbial load of about zero (0) coliform organisms per 100 milliliters.

7. The process as recited in claim 6 wherein the disinfectant has a residual effect.

8. The process as recited in claim 7 wherein the disinfectant is selected from the group consisting of chlorine, iodine, ozone, and chlorine dioxide.

9. The process as recited in claim 1 wherein the filter media is magnesium oxide or aluminum oxide.

10. The process as recited in claim 1 wherein the turbidity of the drinking water is about 0.5 to five (5) nephelometric turbidity units (NTU).

11. The process as recited in claim 1 wherein the water treatment system is portable.

12. The process as recited in claim 1 wherein the water being filtered is released into the top of a j-shaped line having a long straight portion and a short curved portion integral with the long straight portion, and a plate overhanging the end of the small curved portion, further wherein the water exiting the j-shaped line hits the plate and falls onto the filter media in a fountain-like manner wherein channels do not form in the filter media.

13. The process as recited in claim 1 further comprising recirculating the filtered water through the filter media for attracting additional suspended solids whereby the turbidity of the filtered water is further reduced.

14. A process for producing drinking water with a multi-component water treatment system having a granular filter media, the granular filter media having a positive electrostatic attraction force for attracting suspended solids from water which has not first been provided with chemical pretreatment means with a coagulant, and purifying the water which has been filtered with a purifier, the process comprising the steps of:
   placing an electronic sensing device in a location within the water treatment system for sensing at least one measurable process variable;

receiving an input signal from the electronic sensing device in a machine, the input signal being representative of the measurable process variable; and opening a flow path within the water treatment system when the input signal is received by the machine.

15. The process as recited in claim 14 wherein the electronic sensing device is a high water level sensor and a low water level sensor, further wherein the flow path which is opened is an intake flow path from the water source, a filtration path or a recirculation path.

16. The process as recited in claim 14 wherein the electronic sensing device is a media head level sensor, further wherein the flow path which is opened is a backwashing path.

17. A process for producing drinking water with a water treatment system comprising the steps of:

filtering water, without chemically pretreating the water with a coagulant, with at least one granular filter media having a positive electrostatic attraction force for attracting a sufficient amount of suspended solids to produce filtered water having a low turbidity;

cleaning the granular filter media with a cleaner coupled to the filter media, the cleaner producing cleaned granular media which can be used again to attract suspended solids in the water to produce filtered water having a low turbidity; and purifying the filtered water with a purifier to remove a sufficient amount of pathogenic organisms from the filtered water to produce drinking water.

18. The process as recited in claim 1 or 17 further comprising placing a granular activated carbon module in a line through which the drinking water flows for reducing organic contaminants.

19. The process as recited in claim 17 wherein the filter media is comprised of particles having an effective size of less than about one (1) millimeter and a uniformity coefficient greater than about 1.5.

20. The process as recited in claim 17 further comprising a layer of sand combined with the positively-charged filter media.

21. The process as recited in claim 20 wherein the cleaner removes collected suspended solids from a top portion of the layer of sand.

* * * * *

UNITED STATES PATENT AND TRADEMARK OFFICE
CERTIFICATE OF CORRECTION

PATENT NO. : 5,997,750
DATED: Dec. 7, 1999
INVENTOR(S) : E. Robert Baumann et al.

It is certified that error appears in the above-identified patent and that said Letters Patent is hereby corrected as shown below:

On the title page:
In section [75] where the inventors are listed, the inventor order should be changed to --E. Robert Baumann, Ames, Iowa; Lee Rozelle, LaCrosse, Wis.--.
In column 18, line 20, delete "@" and insert --®--, therefore.
In column 18, line 25, delete "(a" and insert --@ a--, therefore.
In column 21, line 12, delete "S1.80" and insert --51.80--, therefore.

Signed and Sealed this

Twenty-sixth Day of December, 2000

Attest:

Q. TODD DICKINSON

*Attesting Officer*          *Director of Patents and Trademarks*